United States Patent
Moldavsky et al.

(10) Patent No.: US 6,768,294 B1
(45) Date of Patent: Jul. 27, 2004

(54) LOW COST DETECTION TECHNIQUE

(75) Inventors: Mark Moldavsky, Petach Tikya (IL); Boris Zhevrlev, Rishon le Zion (IL)

(73) Assignee: Visonic Ltd., Tel Aviv (IL)

(*) Notice: Subject to any disclaimer, the term of this patent is extended or adjusted under 35 U.S.C. 154(b) by 303 days.

(21) Appl. No.: 09/786,873

(22) PCT Filed: Sep. 12, 2000

(86) PCT No.: PCT/IL00/00561

§ 371 (c)(1),
(2), (4) Date: Mar. 12, 2001

(87) PCT Pub. No.: WO01/51894

PCT Pub. Date: Jul. 19, 2001

(30) Foreign Application Priority Data

Jan. 13, 2000 (IL) ................................................ 134026

(51) Int. Cl.[7] .............................................. G01R 23/02
(52) U.S. Cl. .................................................. 324/76.39
(58) Field of Search ................... 324/76.39, 76.16, 324/76.13, 76.41, 76.55, 76.62, 76.61, 76.63, 607, 676, 677, 678, 681; 702/130, 127

(56) References Cited

U.S. PATENT DOCUMENTS

| | | | | |
|---|---|---|---|---|
| 4,480,312 A | * | 10/1984 | Wingate | 702/130 |
| 5,940,786 A | * | 8/1999 | Steeby | 702/132 |
| 6,630,754 B1 | * | 10/2003 | Pippin | 307/117 |

* cited by examiner

*Primary Examiner*—N. Le
*Assistant Examiner*—Donald M. Lair
(74) *Attorney, Agent, or Firm*—Klauber & Jackson

(57) ABSTRACT

This invention discloses circuitry for signal measurement including a signal input, a microprocessor, and an oscillator, the oscillator being operable to generate a pulse signal, the frequency of which is a function of amplitude of a first signal received at the signal input, and to supply the pulse signal to the microprocessor, and the microprocessor being operable to measure the frequency of the pulse signal by comparing the pulse signal with a timing signal, thereby providing an indication of the amplitude of the first signal.

51 Claims, 16 Drawing Sheets

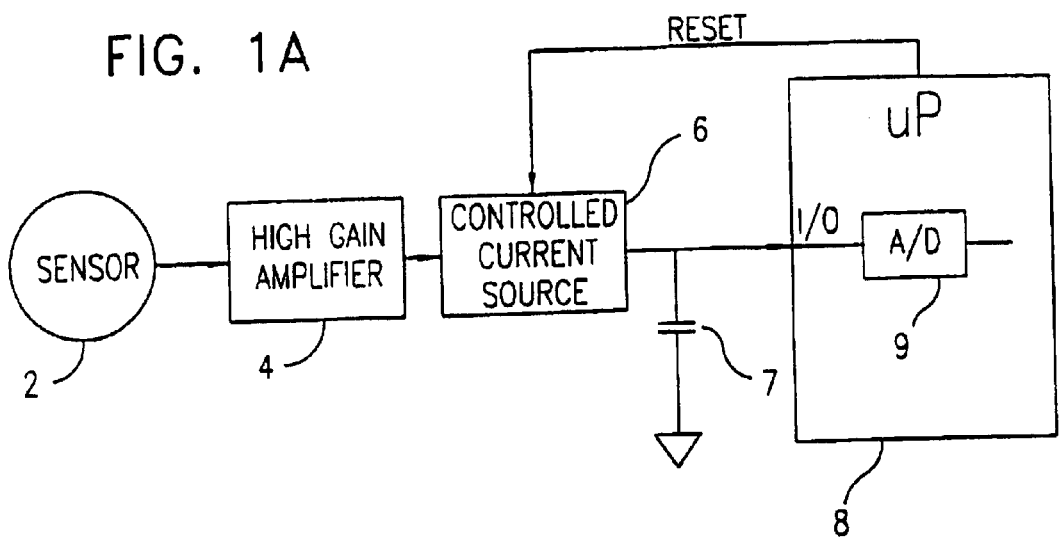
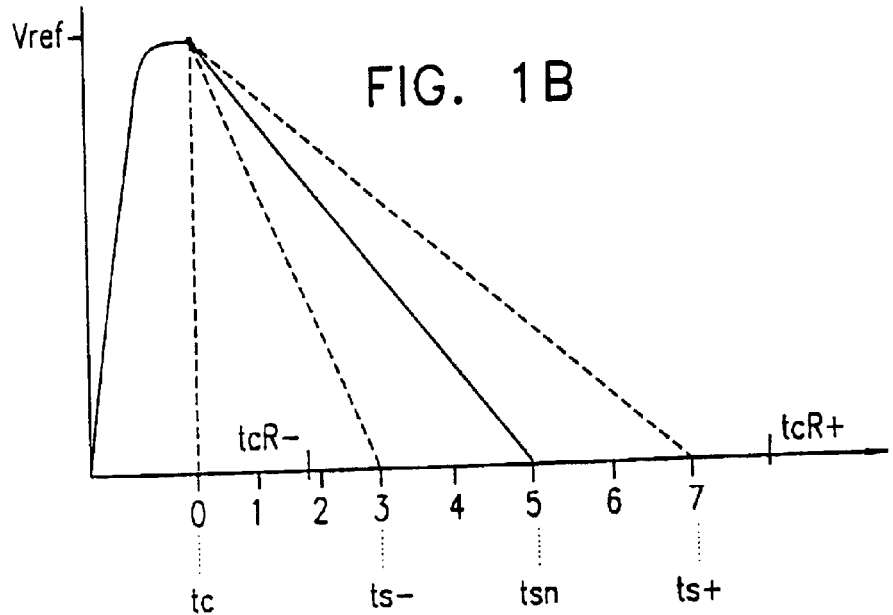
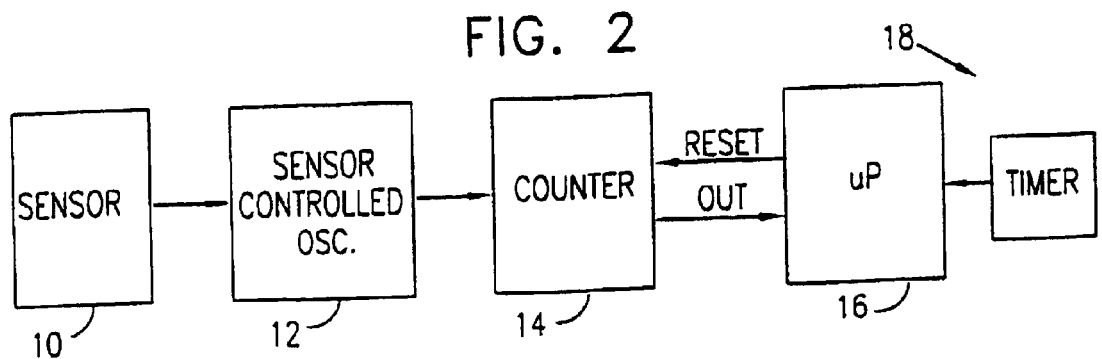

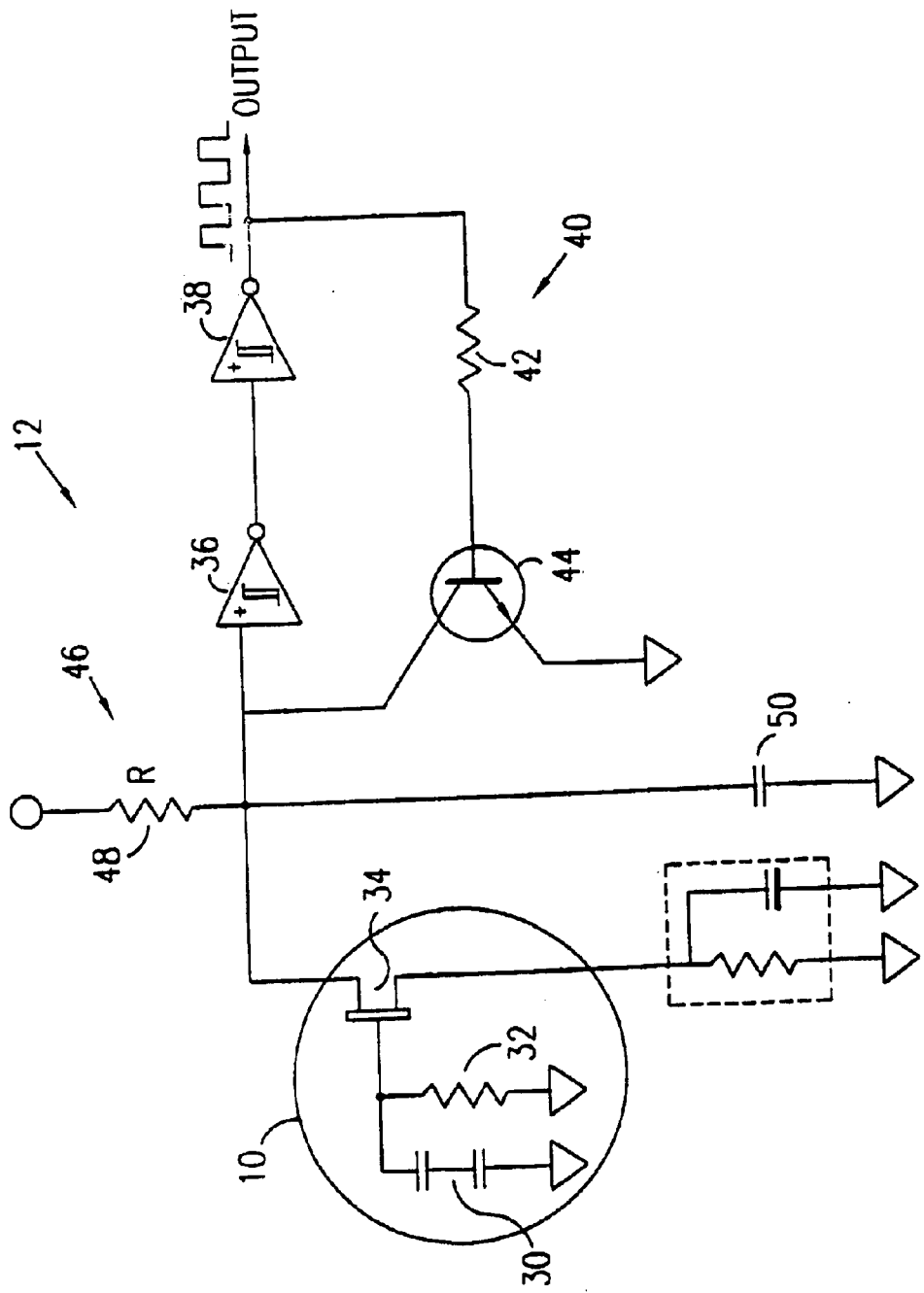

Avg. Freq=4MHz,
Approx. 10.000cycles

LOW COST DETECTION TECHNIQUE

FIELD OF THE INVENTION

The present invention relates to circuitry for frequency domain signal measurement in general and more particularly but not exclusively to such circuitry incorporated into intruder detection systems, energy efficiency systems and the like.

BACKGROUND OF THE INVENTION

There are many kinds of detectors for the purposes of break-in and security, energy control and other purposes, including PIR detectors, microwave detectors, ultrasonic detectors, infrasonic detectors, shock detectors and the like. In all of these detectors, it is the practice to use very sensitive sensors that generally produce a very low signal, which must be amplified in order to allow for the processing of signals.

As is known, one of the main problems in the field of alarm systems is the undesirable, relatively high rate of false alarms. In order to reduce the number of false alarms, there now exist very sophisticated signal processing circuits, sometimes using micro-processors, and these attempt, with the help of sophisticated algorithms and A/D circuits, to better distinguish a real alarm from a false alarm. The accepted solutions are relatively expensive and costly, and the market is very price-sensitive.

A further drawback of sophisticated signal processing is the multiplicity of components which such an approach requires. Every additional component leads to a corresponding reduction in reliability and increases the sensitivity of the system to external RF noise, thus leading to additional false alarms. Reliability of the apparatus and the prevention, or at least reduction, of false alarms are very important issues in the field of security systems.

Passive Infrared Detectors (PIR)

PIR detectors are very popular today in the field of burglar alarm systems and energy control. These detectors use a pyroelectric sensor (explained in U.S. Pat. No. 5,077,549 Col. 1/13–48 and U.S. Pat. No. 5,414,263 Col. 1/12–54, the contents of which are hereby incorporated by reference).

The pyroelectric sensor is connected to a band-pass filter/amplifier having a very high gain of several thousands (generally 5,000). Reference is accordingly made to U.S. Pat. Nos. 4,570,157, 4,468,658, 5,309,147, 4,364,030, 4,318,089, 4,612,442, 4,604,524, the contents of which are hereby incorporated by reference. In these patents the signal is amplified and fed into a window comparator or other voltage comparator, and when the signal exceeds a threshold voltage, the alarm is activated.

In recent years, with the appearance of microprocessors, very sophisticated signal processing methods have been adopted. U.S. Pat. No. 5,077,549, the contents of which are hereby incorporated by reference, describes an alarm based on the principle of signal integration (equivalent to measuring the energy). In this patent it is important to measure the exact form of the signal in order to transform the signal into useful information. In this patent too, use is made of a similar high gain band-pass filter/amplifier.

An additional patent worth noting is U.S. Pat. No. 5,693,943 to Visonic, in which an exact analysis of the form of the signal is used to make a decision regarding a real or false alarm. In this patent too, use is made of high gain amplifiers. Again, it is very important to keep track of the exact form of the signal in order to make the right decision. Similar problems can be seen in U.S. Pat. No. 5,870,022. The contents of both of these patents are hereby incorporated by reference.

In all of the examples cited above and in many others, it can be seen that the electronic circuits contain a large number of components of various kinds, which raise the price of the product and reduce reliability. An additional problem stems from the fact that, due to the weakness of the signal which is generated by the pyroelectric sensor, it is customary to use high-gain amplifiers (between 1,000 and 10,000) and relatively narrow (0.2–8 Hz) pass bands to overcome environmental interference. In these amplifiers, which are low frequency, use is often made of high value capacitors with low leakage. This makes the products more expensive and in particular causes a substantial reduction in reliability, which may be responsible for certain types of false alarm.

The combination of very high amplification and very narrow band pass at low frequency and the use of AC coupling between amplification stages may cause the amplifier to distort the form of the signal. Ringing problems are known as are DC Offset, overshoot and other problems, and these may cause the signal produced by the amplifier to differ significantly from the original signal of the pyroelectric sensor. This, in turn, causes various signal processing problems in detectors which use comparators, and in particular with more sophisticated detectors which analyze the form of the signal (see U.S. Pat. No. 5,084,696, the disclosure of which is hereby incorporated by reference, and U.S. Pat. No. 5,870,022 which is referred to above).

In order to reduce amplifier gain and to improve the processing of the signal, attempts have been made to use high resolution A/D circuits, see for example, U.S. Pat. Nos. 4,546,334 and 5,693,943 referred to above.

Using such a technique, it is possible to reduce some of the levels of amplification which are used in circuits with a window comparator. However, the cost of the circuit rises due to the use of the A/D converter and reliability is not necessarily improved. In recent years, with the appearance of micro-processors comprising internal A/D converters, the use of A/D converters has been expanded—See U.S. Pat. Nos. 5,629,676 and 5,237,330, the contents of which are hereby incorporated by reference. Such use can reduce the required amplification and allows just one amplification stage. However, such processors are more expensive than regular non-A/D processors.

An additional problem, when using PIR detectors, is the question of their immunity to radio frequency interference (RFI) and electromagnetic interference (EMI), which is a main factor in the design of alarm systems with PIR detectors and others. This is a consequence of the low signal levels, and the use of high gain amplifiers with high impedances.

It is also worthwhile noting, regarding PIR detectors, that it is customary to compensate for the effect of the temperature difference between the body of an intruder and room temperature. This can be done directly by means of altering the gain of the amplifier's analog circuit—see U.S. Pat. Nos. 4,195,234 and 4,943,712, the contents of which are hereby incorporated by reference,—or it can be done more exactly using software and a microprocessor—see U.S. Pat. No. 4,546,344, the contents of which are hereby incorporated by reference, and U.S. Pat. No. 5,629,676, referred to above.

There are PIR detectors of various kinds on the market which use two or more pyroelectric sensors and sophisticated signal processing. These detectors are sometimes called QUAD. See for example patents: EPO198,551, GB 2170952, 4,614938, 4,618,854, 4,704,533, 4,697,081, 4,746, 910, 4,912,748, 4,943,800, the contents of which are hereby incorporated by reference.

In the above-mentioned patents each sensor has a separate amplification circuit, such that in practice, the problems discussed above are magnified.

Another kind of detector is a combination of a PIR detector and a detector based on a different technology, such as microwave (MW) or ultrasonic. These are generally called DUAL detectors.

The following patents, EP O147,925, U.S. Pat. Nos. 4,660,024, 4,772,875, 4,833,450, 4,882,567, 5,077,548, 5,216,410, 5,276,427, 5,331,308, the contents of which are again incorporated by reference, show PIR detectors combined mainly with microwave detectors, such that the alarm is activated only when both individual detectors have been activated. All of the above-mentioned patents show PIR detectors which suffer from the above-mentioned problems.

Other Kinds of Detectors

As was explained above with regard to DUAL detectors comprising both PIR and MW, there are detectors which use sensors of various kinds for alarm and other purposes, and there are also combinations of such detectors. For example, in U.S. Pat. No. 3,801,978, the contents of which are hereby incorporated by reference, there is described a combination of MW and ultrasonic detectors.

U.S. Pat. No. 4,401,976, the contents of which are hereby incorporated by reference, shows a combination of ultrasonic, IR and MW detectors. In U.S. Pat. No. 3,573,817, the contents of which are hereby incorporated by reference, there is a combination of several sensors comprising various technologies, for example audio, seismic, electromagnetic and proximity sensors.

U.S. Pat. Nos. 4,991,145, 4,928,085 and 4,920,332, the contents of which are hereby incorporated by reference, show use of acoustic (microphone) detectors for the detection of infrasonic frequencies (changes in air pressure as a result of the opening and closing of doors by a burglar).

In U.S. Pat. No. 4,621,258, the contents of which are hereby incorporated by reference, there is described a detector which operates using the change in capacitance of an antenna and in U.S. Pat. Nos. 5,196,826, 4,970,517 and 4,697,187, the contents of which are hereby incorporated by reference, one can see break-in detectors which operate on the principle of transmission of a microwave signal and an analysis for the presence of the Doppler effect in the reflected signal.

U.S. Pat. Nos. 4,949,075. 4,942,385, 4,016,529, the contents of which are hereby incorporated by reference, show photo-electric detectors which find changes in light beams (in fact generally infra-red), appearing after they have been sent from the light source. These are checked by photoelectric sensors such as Cds, infra-red diodes and others.

U.S. Pat. Nos. 5,047,749, 3,946,224 and 3,803,572, the contents of which are hereby incorporated by reference, show photo-electric detectors having light sensors which detect changes in lighting caused by a burglar moving nearby.

In fire-detection systems, it is customary to use various kinds of temperature sensors, usually thermistors, which check the temperature and changes therein. Here too, the sensors are connected to various amplification and signal processing circuits.

U.S. Pat. Nos. 5,341,122, 5,323,141, 5,192,931, 5,164,703, 4,837,558 and 4,668,941, the contents of which are hereby incorporated by reference, show acoustic detectors which detect the breaking of glass (audio discriminators), operating by means of a microphone or piezoelectric sensor. The signal is processed in various ways and amplified. There are also shock detectors which generally act by means of microphone or piezoelectric sensors and whose purpose is to detect break-in attempts comprising the breaking of a wall, window, door or the like. These detectors are similar to those mentioned above but the signal processing is different.

These detectors also make widespread use of various amplification circuits with problems similar to those discussed above regarding PIR detectors.

In addition to the above mentioned patents, there are numerous patents and detector products in general, and PIR detectors in particular, which use band pass amplifier/filters with very high gain in order to allow signal processing with reasonable reliability as explained above.

There are only a few examples of attempts to avoid the necessity of using amplification circuits of the type described above.

U.S. Pat. No. 4,523,095, the contents of which are hereby incorporated by reference, discloses a system which attempts to avoid use of high-gain amplification. In conventional PIR detector design, an object passing near a detector will produce, as a result of the common design of multiple beam lens systems used in PIR detectors, a relatively high frequency series of pulses, each pulse having a small amplitude. By a manipulation of the fields of view of each detector a method is shown to integrate those small fast pulses into a large measurable pulse. The resultant large pulse can then be analysed by a relatively simple circuit to. indicate an intrusion event.

Another example is to be found in U.S. Pat. No. 4,418,335, the contents of which are hereby incorporated by reference, in which use is made of a charge amplifier instead of the more conventional voltage amplifier. The arrangement allows work to be done directly on the signal produced by the pyroelectric element, without the usual buffering. This is in order to achieve high RFI immunity without complicating the sensor and/or the amplifier and to reduce interference.

The above-mentioned patent makes use of a charge amplifier with a very low input impedance, which significantly reduces interference but creates other problems such as leakage current, which can charge the integration capacitor. The capacitor therefore requires a special discharge circuit.

An additional attempt is described in U.S. Pat. No. 4,929,833. A capacitor is charged to a known voltage and is discharged by means of a current flowing through the pyroelectric sensor. The time from the start of the discharge until a predetermined lower threshold is reached, is measured. This is compared with a nominal discharging time when nothing is detected. If the difference exceeds a given threshold, the alarm is activated. In accordance with the patent, sampling is carried out at a frequency of 8 Hz.

The system described therein has many drawbacks (regarding the method of operation and problems therewith, see U.S. Pat. No. 5,414,263 Col. 1/55–2/18). In addition to the problems therein described, the low 8 Hz frequency makes it difficult to detect signals in the desired range viz. 0.2–15 Hz. For example, a signal with a frequency of 8 Hz may not be detected at all since the effect of the current in the high part of the signal would be cancelled out by the effect of the current in the low part of the signal giving a net effect of 0. In other words, the sensitivity of the detector is very dependent on the frequency of the signal and the detector can be ineffective for certain rates of movement of the intruder/target.

Furthermore, these limitations do not allow sophisticated analysis of a signal as is required of modern intruder detection systems. At best, one can use such a detector as part of a light activation system or lighting control, for example as part of a system for energy management, even that being with the above-described limitations.

An additional, more advanced, attempt can be seen in U.S. Pat. No. 5,414,263, the contents of which are hereby incorporated by reference. As in the previous example, this patent is mainly designed for use in energy and lighting control. In principle, this patent also deals with the measurement of changes in capacitor discharging times, which are proportional to the output current of the pyroelectric sensor.

The system disclosed in the above-mentioned patent, however, still does not meet the precision levels demanded for measurement of the signal (amplitude, time and form), immunity of the measurement to interference, the prevention of false alarms and the ability to distinguish between humans and pets etc., as is required of detectors today.

In U.S. Pat. No. 4,929,823, and in the above-mentioned U.S. Pat. No. 5,414,263, there is disclosed a system using a capacitor, which is attached via an amplifying circuit comprising a transistor, to a pyroelectric sensor, and which discharges at a known rate. The changes in the current of the pyroelectric sensor are amplified by the transistor and cause variations, positive or negative (depending on the direction of the current), in the discharge time of the capacitor.

The capacitor is charged by a signal processing circuit, such as a microprocessor, which, by means of appropriate algorithms, charges the capacitor and then measures the time to discharge to a preset lower threshold. The signal processing circuit checks whether there has been any change in the measured discharge time compared to the "no detection" state discharge time, or whether there is any long term change in the average discharge time. It then decides whether the change is a substantial movement event or not. (see above-mentioned patent Col. 2/40–58.)

The signal processing circuit in U.S. Pat. No. 5,414,263 constantly checks and computes the average discharge time of the capacitor over a long period, to take into account disturbances such as rain and wind. By means of this computation, the threshold level automatically adjusts for signal activity.

The signal processing circuit also includes automatic correction for pyroelectric sensors and various other components in which there are differences in operating specifications and tolerances (see therein col. 2/58–68).

The system described in U.S. Pat. No. 5,414,263 requires a current amplifier, because the current which is produced by the pyroelectric sensor is not sufficient to effect the discharging time of the capacitor in a manner effective for signal processing (see col. 4/27–30 and col. 4/36–39).

In addition, the pyroelectric sensor currents are used to check that the detected movement was in fact substantial, in order to warrant switching (col. 4/33–36).

The signal processing circuit charges the capacitor and measures the time necessary for discharging by means of the transistor until the voltage is equalized. The pyroelectric sensor current can increase or decrease the capacitor discharging time. (col. 4/39–45).

The signal processing circuit compares the capacitor discharge time with the "normal" discharging time or with the average discharge time over a relatively long period in order to determine whether a substantial movement event has occurred. If the time measured is outside the time window around the average discharging time, this is regarded as indicating a substantial movement event. If additional conditions are met, an alarm condition is triggered.

The additional conditions may include a requirement for a minimal number of substantial movement events detected as a cycle, a minimal number of cycles or a specific sequence of events (col. 4/45–55).

By computing the average discharging time over a period, it is possible to dynamically and automatically correct the movement threshold, thus dynamically filtering infra-red interference from the environment and canceling component parameter changes (col. 4/56–col. 5/5).

In one of the embodiments, a microprocessor charges the capacitor via an I/O port to maximum voltage and then allows the capacitor to discharge. The processor measures the capacitor discharging time from the charged voltage level to a second, lower, voltage level.

The time difference between the measured time and the average time (for a long period) serves:
A. To update the average discharge time over a long period.
B. To check whether the detected events are in fact substantial movement events (col. 5/47–67).

The preference is to measure the capacitor discharge 60 times per second and to update the equalizing time 30 times per seconds The update is done by summing the existing average time with the delta of the new discharging time. The preferred ratio is 15/16 of the old average time+1/16 of the last measured time. Thus, the average time can change only at a very low frequency. The detector hence responds only to frequencies which are higher than a particular frequency dictated by the rate of the updates (30 times per second in this embodiment) and the mixing ratio (1/16 in this embodiment). Calculation suggests that, in this embodiment, the lowest frequency to which the detector reacts is 0.4 Hz. (col. 5/68–col. 6/28).

The decision as to whether there is movement is made as follows:

The difference between the measured discharging time and the average equalization time is determined. If the difference is less than the value of the sensitivity threshold which corresponds to the lowest sensitivity which was set, the decision is that there is no movement. If the difference is greater than the sensitivity threshold then the decision is that there is movement.

In order to decide whether or not to activate the detector, it is then necessary to check whether the movement is significant or not. The check is done by counting the number of consecutively occurring movement events. In this embodiment significance is implied by four consecutive events, that is to say if there were only three or less events (consecutively), the counter is reset.

In the preferred embodiment, the rate of sampling is 60 per second and the counter stands at 4 consecutive events. Consequently, four cycles are needed of 60 Hz in order to activate the load. This implies that frequencies greater than 7.5 Hz will not be detected. This is not in fact the case as will be explained below.

The sensitivity threshold and the counter can be chosen as needed. Similarly, a pulse sequence and other times and other algorithms can be chosen.

It is possible to sample the signal 100 times per second and to connect the sample rate (60 Hz) to the network voltage.

U.S. Pat. No. 5,414,263 is known to give rise to the following problems:
1. Sensitivity Threshold (col. 6/36)

Its results are at best similar to the results obtained from conventional detectors which work by comparing the amplified signal voltage to a series of voltage threshold levels in a window comparator, the threshold levels being equivalent to the sensitivity threshold of the measured delays in the above patent.

In other words, what is indicated is whether the measured signal is more or less than the threshold current. In effect, what U.S. Pat. No. 5,414,263 does is to transform a voltage measurement into the time domain using data measured in a conventional manner. The transform into the time domain using a capacitor-based circuit is itself well-known in the art. For example application note DS00513A (1990) published by Microchip Technology Inc. (USA) describes such a transform. A capacitive charging circuit is used to convert an input voltage into time, which can easily be measured using a microcontroller. By use of a CMOS Quad bilateral switch controlled by the microcontroller, the reference voltage is applied. By means of a current converter the circuit provides a linearly variable current as a function of input voltage. The capacitor is charged up until it trips the threshold on the microcontroller I/O input. This generates a software calibration value that is used to calibrate most circuit errors, including inaccuracies in the resistor and capacitor, changes in the input threshold voltage and temperature variations. After the software calibration value is measured, the capacitor is discharged and the input voltage is connected to Vin. The time to trip the threshold is measured for the input voltage and compared to the calibration value to determine the actual input voltage.

In the voltage window comparator system, it is impossible to receive data on the exact value of the signal. Likewise, in the above-mentioned patent one does not measure the exact signal value. In practice, one cannot know whether the signal is 10 times the sensitivity threshold or just greater than it by 2%. Likewise, it is impossible to know whether the signal is 30% of the threshold or 98% of it. Consequently, one cannot measure the form of the signal or process the signals, as is required for example in Visonic U.S. Pat. Nos. 5,693,943 and 5,870,002 or U.S. Pat. No. 5,077,549.

2. The Use of a Counter to Create a Filter in the Field of the High Frequencies

In order to remove interference, it is more important to filter high frequencies than those at or near the detection level. In particular it is important to filter out frequencies associated with the electricity supply system. In many patents in the field this has been achieved by means of filters of various types, mainly analog, most of which are combined with band pass amplifier/filters.

The above-mentioned filters, however, do not perform satisfactorily because their response curve is not sharp enough and therefore they are dependent on the level of the interfering signal voltage. In recent years attempts have been made at more sophisticated digital signal processing which examines inter alia the frequency of the signal and completely filters all frequencies which are outside the desired band. This is done without any dependence on the voltage level. For example, all of the frequencies which are outside the 0.2–15 Hz band would be completely removed regardless of their voltage.

In U.S. Pat. No. 5,414,263, an attempt was made to implement a different kind of filter by means of a specific sample rate (60 Hz), and a counter which counts four consecutive events. Although it is possible to achieve a certain filtering level (in the present case the high frequency which was set was 7.5 Hz), the quality of the filter is worse than conventional analog filters. The following are the problems that may be noted in the system used in U.S. Pat. No. 5,414,263:

A. As with an analog filter, this filter is also dependent on the signal voltage. If the voltage level is high enough in relation to the threshold, the signal may be passed by the filter because there is no synchronization between the interference signal and the sampled frequency.

B. If the interference is a result of frequencies at half of the sampled frequency or at the sample frequency itself or any multiple thereof, the samples might appear at the peak point of the signal or close thereto and then even signals being a fraction of the threshold value would be likely to get through the filter.

C. Inasmuch as the filter works by passing only signals which are larger than the threshold value, a situation may be created wherein there is a set signal on the mains frequency, which is at a lower level than the threshold value (as is in practice), which in effect is not detected or filtered. However, when the real signal appears with a relatively low value which, normally, would not be detected, a situation is created in which the two signals superimposed one upon the other are likely to pass the threshold and to create an unwanted alarm.

D. Inasmuch as several consecutive events are needed to implement the filter action, should there arise interference whilst a movement event is being detected, the superimposed disturbance may ruin the measurement in a specific sample, thereby resetting the event counter without detection. Any attempt to change the manner of the count in order to overcome this could harm the operation of the filter.

E. Despite the fact that the possibility is raised of using a variety of pulse patterns or a minimal number of events or a minimal number of cycles or a particular sequential spread (col4/51–55, col. 6/667–col7/4), it is clear that any such criterion would harm or cancel the actions of the filter in the high range and cause false alarms or non-detection problems.

3. Microprocessor with A/D

In the above-mentioned patent, use is made of a microprocessor which both charges the capacitor and measures the discharge time. Such a microprocessor generally has an I/O with an A/D converter in order to allow it to measure the voltage to which the capacitor discharges. Such a microprocessor is more expensive than a regular processor without A/D. It is possible to use a processor without A/D but the precision of the measurement may be low and it might be easily affected by electrical and other disturbances.

SUMMARY OF THE INVENTION

An object of the present invention is to produce PIR and other types of detectors, including combined detectors, with a small number of components, greater signal measurement accuracy, minimal or no amplification, a minimal distortion of the signal, high reliability and better immunity against RFI and EMI interference, and which requires only the most basic microprocessors on the market.

A further object of the present invention is to provide a signal processing circuit for various sensors by means of a very basic. microprocessor, negating the need to use amplification and other circuits and optimally exploiting the characteristics of the microprocessor in order to substantially reduce the price of the product, improve its immunity to disturbance, make the signal processing more precise, with minimal amplification distortion, and enhance the product. According to a first aspect of the present invention there is provided circuitry for frequency domain signal measurement comprising:

a signal input, a microprocessor, and an oscillator, said oscillator being operable to generate a pulse signal, the frequency of which is a function of amplitude of a first signal received at said signal input, and to supply said pulse signal to said microprocessor, and said microprocessor being operable to measure the frequency of said pulse signal by comparing the pulse signal with a timing signal, thereby providing an indication of the amplitude of said first signal.

In an embodiment, the timing signal is in the form of a timing window. Preferably the pulse signal comprises pulses which are countable by a counter, said counter being connected to said microprocessor to give an indication to said microprocessor that a given number of pulses has been counted. Again, preferably the pulse signal is connected directly to said microprocessor. In such a case the pulse signal is advantageously supplied to a clock input of said microprocessor.

The apparatus may further comprise a specially constructed timing circuit, wherein an output of said timing circuit comprises said timing signal. This is helpful when the pulse signal is being connected to the microprocessor's clock input, as the microprocesser needs an independent timing signal. Preferably the microprocessor is operative to count said pulse signal over said timing window. The clock input may be an external clock input.

In a preferred embodiment, the oscillator is wholly external to said microprocessor. The oscillator may utilize internal features of said microprocessor or it may be wholly external.

The sensor signal may be analog or digital, and the term digital, in this specification, includes not only binary but other discrete level signals.

According to a second aspect of the present invention there is provided circuitry for frequency domain signal measurement comprising:

a signal input, a microprocessor and a clock oscillator circuit operable to generate a clock signal for said microprocessor, wherein the frequency of pulses of said microprocessor clock signal is variable as a function of the amplitude of a signal received at said signal input, and said microprocessor is operable to process the clock signal and to provide an output indication of the amplitude of said signal received at said signal input.

The circuitry preferably comprises a timer operable to define a pulse counting time duration for counting a plurality of said clock pulses, the timer being further usable by said microprocessor in processing said signal. Preferably the microprocessor is operable to count a plurality of pulses over said time duration. The timer may comprise a capacitor-based circuit and may additionally be connectable to utilize an I/O port of said microprocessor. Preferably the clock oscillator circuit utilizes a microprocessor built-in clock circuit, but may alternatively be wholly external to said microprocessor.

The signal received at the sensor input may be analog or digital, and, as mentioned above, the term "digital" covers not only binary but also other types of discrete level signal.

The signal received at the signal input is preferably from one or more sensors, which may be part of a security system and may be one of a whole series of sensors including an infra-red sensor, and a pyroelectric sensor. The sensor may be connected to said clock oscillator circuit via an interface circuit, which may be operable to perform buffering or even amplification.

According to a third aspect of the present invention there is provided detection apparatus comprising a sensor providing sensor signal output, a microprocessor, and a clock oscillator circuit generating a clock signal for said microprocessor, wherein the frequency of said microprocessor clock signal varies as a function of the amplitude of said sensor signal, and said microprocessor processes the clock signal and provides a detection indication when said sensor signal fulfils certain criteria. Preferably such apparatus further comprises a timer operable to define a pulse counting interval for counting a plurality of said clock pulses, and wherein said timer is usable by said microprocessor in processing the signal.

The microprocessor is preferably operable to count said plurality of pulses over said time duration. The timer preferably comprises a capacitor-based circuit, and utilizes an I/O port of said microprocessor. The clock oscillator may be external to said microprocessor but may utilize the microprocessor built-in clock circuit.

The sensor signal may be analog or digital as mentioned above.

The circuits discussed above are useful for, inter alia, intrusion prevention, theft prevention, lighting control, vibration sensing, shock sensing, and displacement sensing.

Preferably the sensor is any one of a group comprising an infra-red sensor, a quad-element infrared sensor, an acoustic sensor, an infrasonic sensor, an ultrasonic sensor, a photoelectric sensor, an electromagnetic field sensor, a temperature sensor, and a smoke-detecting sensor.

In an embodiment, there is provided a second sensor, which may be any one of a group comprising an infra-red sensor, a quad-element infrared sensor, an acoustic sensor, an infrasonic sensor, an ultrasonic sensor, a photoelectric sensor, an electromagnetic field sensor, a temperature sensor, and a smoke-detecting sensor. The microprocessor may process the two signals from the two sensors either by time multiplexing (e.g. connecting to one and then the other) or by distinguishing between the two based on the characteristics of the signals (e.g. frequency). As will be apparent to persons skilled in the art, a plurality of sensors may be incorporated into a single apparatus.

According to a fourth aspect of the present invention there is provided a method for signal measurement comprising:

providing a first signal to an oscillator circuit operable to generate a clock signal for a microprocessor, wherein the frequency of said clock signal is variable as a function of the amplitude of said first signal, and said microprocessor is operable to process the clock signal and to provide an output indication of the amplitude of said first signal.

An embodiment allows for defining a pulse counting time duration for measuring of said first signal.

Preferably, said analog signal generates clock pulses of said microprocessor clock and said microprocessor is operative for pulse counting of said clock pulses over said time duration. Alternatively, the analog signal generates clock pulses of said microprocessor clock, and said microprocessor counts pulses having a frequency which is a function of the frequency of said clock pulses over said time duration.

Preferably the step of measuring the modulation of said frequency comprises applying the modulated frequency to the external clock input of a microprocessor to produce clock pulses, applying a windowing signal to said microprocessor to define a measurement window, and counting a number of clock pulses occurring within said measurement window. The weak signal source may typically be an intrusion sensor, for example a pyroelectric sensor.

An embodiment of the method comprises the additional steps of placing a calibration radiation source in association with said intrusion sensor, applying a measured amount of energy to said calibration radiation source to cause said calibration radiation source to produce radiation, measuring an output of said sensor produced in response to said radiation, and calculating a correction factor to cancel out any deviation of said output from an expected output.

In a further aspect of the present invention there is provided circuitry for signal measurement comprising an input for receiving a signal having a varying amplitude from a sensor, a converter for converting said varying amplitude into a varying frequency, and a measuring device operable to determine parameters of the sensor signal by measurement of variations in the frequency.

BRIEF DESCRIPTION OF THE DRAWINGS

For a better understanding of the invention, and to show how the same may be carried into effect, reference will now be made, purely by way of example, to the accompanying drawings, in which:

FIG. 1A is a simplified block diagram showing a prior art device.

FIG. 1B is a graph showing the operating characteristics of the device of FIG. 1A, FIG. 2 is a generalized block diagram showing a first proposed solution of the problems of the prior art, FIG. 3 is a generalized schematic diagram showing in more detail the sensor and the oscillator of FIG. 2.

DESCRIPTION OF THE PREFERRED EMBODIMENTS

Figure 4:
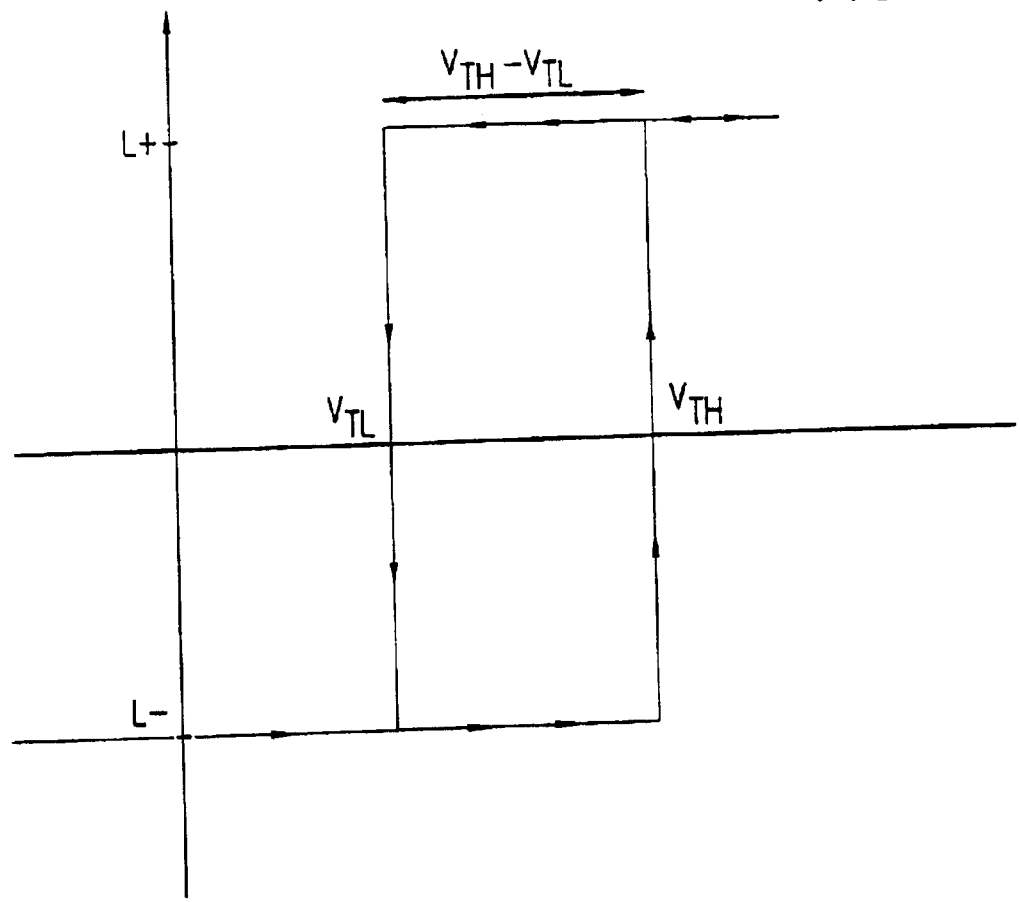
FIG. 4 is a typical input-output voltage characteristic of a Schmitt trigger.

Reference is now made to FIG. 1A, which is a simplified block diagram of a prior art device. FIG. 1A shows a sensor 2, attached via a high gain amplifier 4 to a controlled current source 6 having a capacitor 7 connected between its output and ground. The output of the current source 6 is fed to a microprocessor 8 via an input port having an internal A/D converter 9. A reset connection is provided between the microprocessor 8 and the controlled current source 6.

In operation the sensor 2 produces a weak current, the exact strength of which depends on the level of detection. The weak current is amplified by the high-gain amplifier, which preferably has a gain of up to 10,000. The microprocessor 8 charges capacitor 7 to a predefined high voltage level, whilst its I/O port is set to low impedance, and then begins a time measurement period, changing its I/O port to high impedance. The capacitor discharges through the controlled current source at a rate that is a function of the amplified sensor signal. The voltage of the capacitor is monitored through the I/O port of the microprocessor using the A/D interface 9, and when the capacitor voltage level reaches a predefined low voltage, the time measurement stops.

Reference is now made to FIG. 1B, which is a graph showing the voltage-time characteristic of the device of FIG. 1A. The capacitor 7 is ordinarily charged to maximum voltage in a time $t_c$ via current from the microprocessor 8. The capacitor is then discharged to a low voltage threshold, as mentioned above. Detection by the sensor 2 causes minor variations in the output thereof, which are then amplified and affect the capacitor discharge cycle. If nothing is being detected by the sensor, then discharge to the threshold level takes time $t_{sn}$. On the other hand, if the sensor is activated, the currents produced thereby effect the discharging cycle of the capacitor, which may take as little as $t_{s-}$ or as long as $t_{s+}$. Further limits $t_{cR-}$ and $t_{cR+}$ indicate wider deviations in the discharge time that are also possible, as will be explained below.

In order to receive data regarding the exact form of a signal, one can use the fact that variations in the discharge time are related to the level of the signal created by the pyroelectric sensor. The relationship may be linear or otherwise, depending on the circuit converting from the pyroelectric sensor current to the measured time. $T_s = F(I_s)$, where:
$I_s$ = current produced by the sensor,
$T_s$ = The discharging time when influenced by current $I_s$, In order to allow for sophisticated signal processing based on precise measurement, the signal processor circuit must be capable of measuring the signal at a resolution of at least 1:250.

In order to measure frequencies of up to 10 Hz (in the case of PIR detectors), it is desirable to take a sample of at least 10 times the frequency, namely 100 Hz, in order to receive good precision of the form of the signal and, particularly, identification of the peak or turning point of the signal.

With regard to other detectors, it is possible that the frequency of interest will be higher or lower than 10 Hz. The sampling rate may be adjusted accordingly.

In the above example, the measurement cycle time is 10 ms. We may assume that the charging circuit charges the capacitor in 1 ms and the normal discharging time (without a signal) is 5 ms and the range of the discharging time with the effect of the signal is ±2 ms. Thus, as shown in FIG. 1, time $t_c$ is the charging time of the capacitor 7 to maximum voltage. The normal discharging time is $t_{Sn}$ and the dynamic range is between $t_{S+}$ and $t_{S-}$. As can be seen, the normal discharge time is approximately 5 milliseconds and can change by ±2 milliseconds as a function of the signal. (Charging may typically take 1 ms.)

As shown in FIG. 1B, the discharge curve can in fact exceed the limits referred to above and is able to move right or left in the range of $t_{cR+}$ to $t_{cR-}$, as a result of parameter variations of components in the circuit.

This larger deviation effect can be cancelled out by altering the parameters of the discharging or charging circuit such that the dynamic range of the discharging curve always remains within the bounds of a fixed cycle time without deviating therefrom.

In the example of FIG. 1, the deviation range is 5 ms±2 ms, giving a dynamic range of 4 ms. The required resolution is 1:250, namely 16 µs in this example, assuming that the curve of the effect of the signal on the discharge time is linear. If the curve is not linear, it is possible that the resolution may change in time over the length of the discharging curve.

When using a microprocessor, the voltage of the capacitor is preferably examined at least every 8 µs in order to achieve reasonable precision.

When using a microprocessor to which the sensor is connected via an I/O port, the capacitor voltage is preferably measured every 8 µs. Typically the measurement may require 4 machine instructions and each instruction may typically require 4 machine cycles, so the measurement itself takes 0.5 µs. The microprocessor is also required to charge the capacitor, and all this implies a 4 MHz clock rate for the microprocessor. Even at this rate, though, most of the microprocessor resources will be used only for sampling.

The microprocessor measures each discharge cycle as a single event. Measurement inaccuracies, in particular resolution inaccuracies, are liable to accumulate.

It is also possible to connect the capacitor voltage to an interrupt input of the microprocessor. Such a connection may however demand a separate circuit for charging the capacitor. Resolution is, once again, a matter of machine command cycles and is measured over each charge-discharge cycle as a single measurement.

A problem with the embodiment exemplified by FIG. 1 is that a relatively fast microprocessor is needed in order to do the signal processing.

An additional problem is that in order to achieve good precision in measuring the discharge time, one needs a high precision circuit for measuring the discharge voltage. The use of an A/D circuit in the microprocessor makes the microprocessor more expensive, as mentioned above and it is desirable that this be avoided.

An additional problem is that electrical interference occurring during the measurement process can distort the form of the signal being measured and thus ruin the measurement of that cycle. For example, if the discharge voltage of the capacitor is 2.5 V and the resolution of the A/D circuit which measures the discharging voltage is 1:250, namely 10 mv, any noise appearing on the A/D circuit or on the capacitor at a value of more than 10 mv may ruin the measurement. Thus, if an interfering pulse of 1.5 V appears on the supply voltage during discharge, and is transferred via the capacitor to the A/D circuit, the capacitor voltage at the measurement point may reach equilibrium and the microprocessor may decide that the discharging time is concluded, when in fact the discharging time has only reached its halfway point.

In practice, interference lasting for just 2–3 µs is sufficient to ruin completely a measurement that lasts 6 ms. Thus, in a noisy environment, where serious signal distortion is received, operation of the signal processing circuit may be prevented completely. Thus the conversion circuit must be properly screened from the external environment and this contributes to the cost of the product. Alternatively, one must perform additional software operations that may either ruin the precision of the time which is measured or, alternatively, may employ the processor for a longer period of time and reduce the time available to perform other operations.

Reference is now made to FIG. 2, which is a simplified block diagram showing a first proposal for solving the problems of the prior art. FIG. 2 shows a sensor 10, preferably a pyroelectric sensor, connected to the input of an oscillator 12. The oscillator 12 is connected via its output, to the input side of a counter 14. The counter 14 is connected via its output to an input port of a microprocessor 16 and via its reset input to an output port of the microprocessor 16. A further port of the microprocessor 16 is connected to a timer circuit 18.

The counter 14 advances at the rate of a clock signal output of the oscillator 12. The sensor 10 being connected to the oscillator input as described above, affects the frequency of the oscillator.

The skilled person will be aware that the sensor need not be a pyroelectric sensor and may be exchanged with other sensors, resistors, capacitors or the like.

As will be described in more detail below, the oscillator is arranged to oscillate relatively rapidly. The measurement cycle, using the apparatus shown in FIG. 2, is as follows:

Before the beginning of the cycle, the microprocessor 16 produces a reset signal which resets the counter 14. At the beginning of the cycle, the reset signal is clocked into the counter 14 and the counter 14 begins to advance at the clock rate produced by the oscillator. When the counter 14 reaches a pre-determined value, the output is activated. The output is connected to an input port of the microprocessor or alternatively to another entry such as the interrupt.

The microprocessor 16 measures the time interval between the removal of the reset signal and the activation of the output of the counter 14. However, as will be explained below with respect to FIG. 3, it is the sensor output that governs the operation of the oscillator 12 and thus the interval measured is a function of the sensor signal. The time interval measured is in fact equivalent to the time measured in the embodiment of FIG. 1, but as will be apparent below, is immune to many of the disadvantages previously discussed.

The timer circuit 18 provides the microprocessor 16 with a regular clock signal.

Reference is now made to FIG. 3 which is a generalized schematic diagram showing in more detail the sensor 10 and the oscillator 12 of FIG. 2. The sensor 10 is a pyroelectric sensor, as discussed above, and comprises a capacitive double sensing element 30 connected in parallel with a resistor 32. These are in turn connected to the gate of a MOS transistor 34. The oscillator 12 is formed by two successive Schmitt triggers 36 and 38 connected together one after the other. A switching arm 40 connects the output of the second Schmitt trigger 38 to the input of the first Schmitt trigger 40 and comprises a resistor 42 and a transistor 44.

Reference is now made to FIG. 4 which shows a typical input-output voltage characteristic of a Schmitt trigger. The trigger is a bistable circuit having a first stable output voltage $L_+$ and a second stable output voltage $L_-$. In addition it has two threshold voltages $V_{TL}$ and $V_{TH}$, for switching therebetween. The difference between the two threshold voltages $V_{TH}-V_{TL}$ is the hysteresis range of the trigger.

Returning now to FIG. 3, a serial RC circuit 46 is connected between the power supply and ground and between the sensor 10 and the oscillator 12. The serial RC circuit 46 contains a resistor 48 and a capacitor 50. In operation the Schmitt trigger begins in its low state L–. Current from resistor 48 begins to charge the capacitor 50. The sensor 10 operates in a manner which influences the charging and discharging of capacitor 50. If detection is taking place, the sensor current will vary and this variation will produce an effect on the charging and discharging time of the capacitor. When the capacitor has been charged to $V_{TH}$, the higher of the Schmitt trigger thresholds, it switches the trigger to the high output state $L_+$. The output of the Schmitt trigger 38 is connected to the gate of transistor 44 and the $L_+$ voltage is sufficient to turn the transistor on, creating a direct path to earth for the capacitor to discharge. The discharge rapidly reduces the input voltage on amplifier 36 to the low threshold voltage $V_{LT}$ and returns the trigger to its low output state $L_-$. The cycle that has been described is a single oscillation of the oscillator 12 and the values of the resistor 48 and capacitor 50 are selected such that it occurs relatively rapidly, a single measurement cycle comprising a large number of oscillations.

In other words, oscillator 12 produces a regular frequency output upon which a modulation of the frequency is superimposed, which modulation is substantially proportional to the amplitude of the signal being output from the sensor 10. That is to say the analog signal produced by the sensor is converted into a frequency signal. The frequency signal is then measured by the counter 14 and the microprocessor 16 to produce an output indication of the original amplitude of the sensor signal.

As with the device of FIG. 1, the full measurement cycle described above is preferably repeated every 10 ms. The measured time delay can vary within a range of 6±2 ms and there is the possibility of altering the range as a result of changes in component parameters, such as the non-detection current of the sensor and the like.

Figure 5:
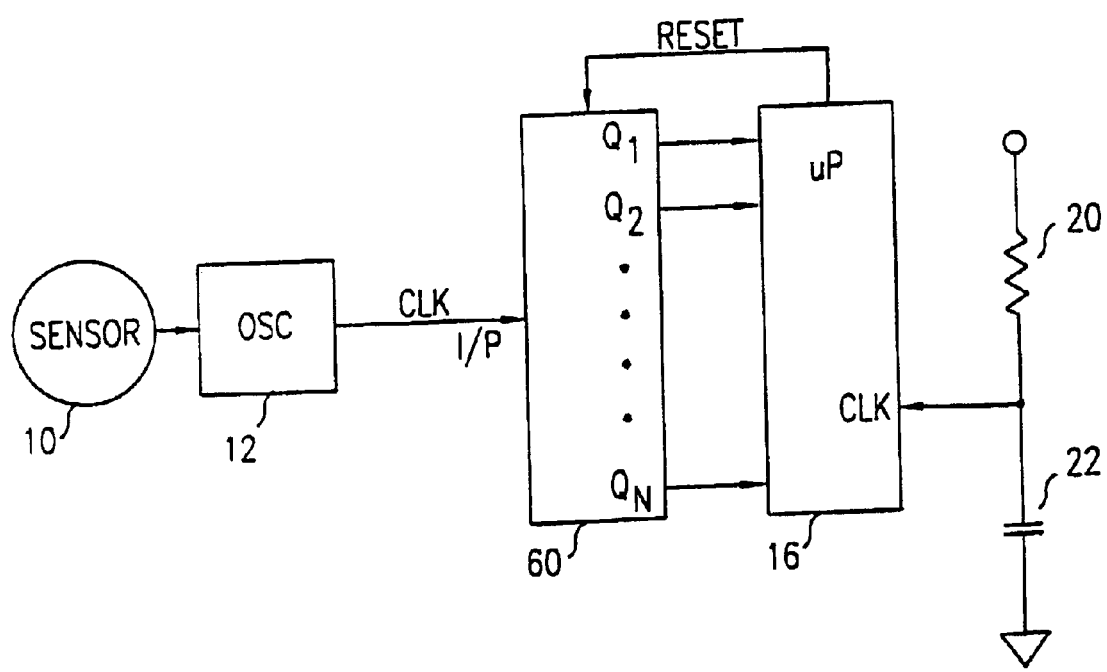
FIG. 5 is a simplified block diagram of circuitry for signal domain measurement operative in accordance with a first embodiment of the present invention.

Reference is now made to FIG. 5, which shows circuitry for frequency domain signal measurement operative in accordance with a first embodiment of the present invention. Parts which are the same as those shown in previous figures are given the same reference numerals and are not described again. An RC circuit, comprising a resistor 20 and a capacitor 22, is provided as part of the arrangement, in conjunction with the microprocessor clock for determining the microprocessor clock rate. The output of the oscillator 12 is fed to a multi-state counter 60, which counts up the number of oscillations and indicates the number reached. The microprocessor 16 checks the output state of the counter 60 after a fixed delay, typically 6 ms, and simply inputs the number of oscillations, afterwards resetting the counter. This is to be contrasted with the embodiment of FIG. 2 in which the counter 14 always counted up to a fixed number and the microprocessor measured the time taken to reach that number.

It will be appreciated that in the embodiment of FIG. 1 the capacitor is only discharged once in each measuring cycle whereas, as previously discussed, in FIGS. 2, 3 and 5, the capacitor is discharged many times during the cycle. If, for example, the cycle time is 10 ms and the normal measurement time is 6 ms, a preferred oscillator frequency may be in the range of 500 KHz. Thus, a capacitor charge—discharge cycle may occur once every 2 $\mu$s, that is to say 3000 times as opposed to once.

The significance of the rapid charge-discharge cycle is that the final measurement is the average of typically 3,000 separate individual measurements. Consequently, an error in a particular measurement, for example as a result of electrical interference, should affect the final result of the cycle by a ratio of 1:3000 and not 1:1 as in the embodiment of FIG. 1, making the embodiment much more resilient to interference.

In practice, it is found with embodiments of the present invention that inaccuracies and interference appearing in the measurement of capacitor discharging times and voltage levels tend to average out and be cancelled because the measurement is repeated so many times.

An additional advantage is that amplification is not needed. The capacitor 50 carrying out the measurement is much smaller than in the prior art and thus is able to be affected significantly by the small unamplified output level of the sensor 10. In addition, the actions of the oscillator and counter are sufficient in themselves to produce an output suitable for the microprocessor. By contrast, in the prior art it is necessary to provide a high degree of amplification of the current of the pyroelectric sensor in order to obtain an easily measurable effect on the discharging time of the relatively large capacitor.

An additional advantage of the embodiments of FIGS. 2, 3, and 5 is that the microprocessor does not have to measure the voltage level of the output of the capacitor. Hence it does not need an A-D converter, and it has more time to perform other duties, thus obviating the need for a faster processor.

Figure 6:
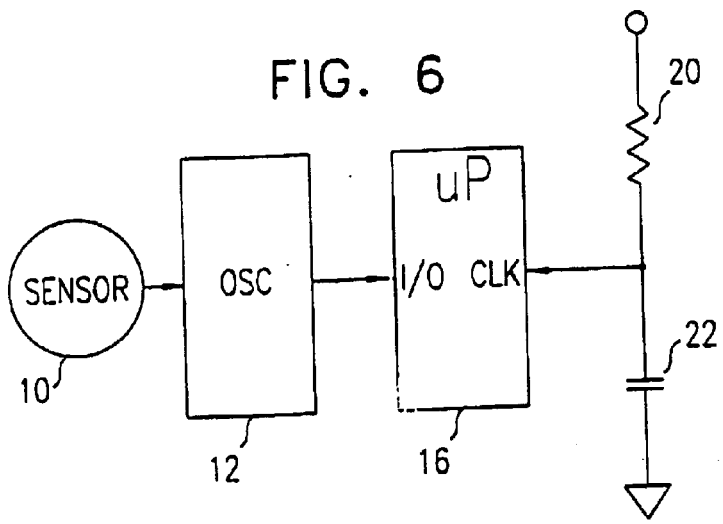
FIG. 6 is a simplified block diagram showing circuitry for frequency domain signal measurement operative in accordance with a second embodiment of the present invention.

Reference is now made to FIG. 6, which is a simplified block diagram showing circuitry for frequency domain signal measurement operative in accordance with a second embodiment of the present invention. Parts that are the same as those shown in previous figures are given the same reference numerals. In FIG. 6, the sensor 10 and the oscillator 12 are connected together in the same way as in the previous embodiments. However, as the output of the Schmitt trigger is effectively a digital signal, the output of the oscillator 12 may be connected directly to the microprocessor 16. The term "directly" may include connections through either an I/O port or an interrupt port of the microprocessor. The I/O port has the disadvantage of having to be sampled for high to low voltage changes and for charging up the capacitor. By contrast, the interrupt port does not need to be sampled because it automatically reports to the processor when a threshold is crossed. Not only does this save on sampling but, because the interrupt is immediate, it gives greater resolution of measurement. However, even if using an interrupt port the processor will regularly be halted by the interrupt. Either way, most of the processor's resources will generally be consumed in the charge-discharge cycle of the capacitor.

As mentioned above in respect of FIG. 3, a preferred minimum rate of oscillation is in the region of 500 KHz. A software counter able to count at such a rate is liable to use up a considerable proportion of the resources of a typical 4 MHz processor, leaving very little time for other tasks. One solution is to use a faster, but more expensive, processor.

Figure 7A:
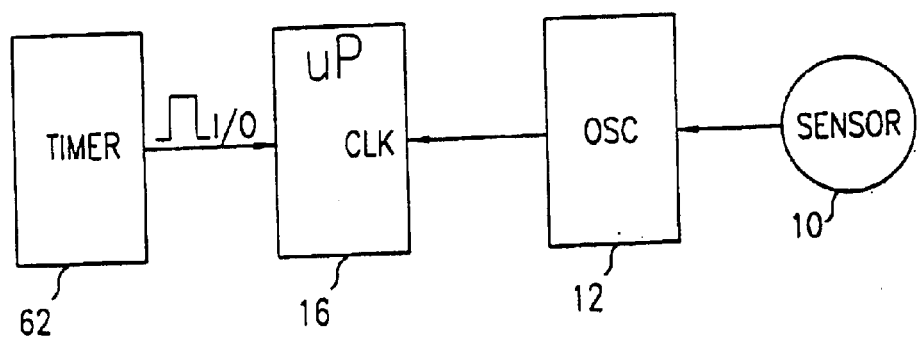
FIG. 7A is a simplified block diagram of circuitry for frequency domain signal measurement operative in accordance with a third embodiment of the present invention.

Reference is now made to FIG. 7A, which is a simplified block diagram of a third embodiment of the present invention. In the embodiment of FIG. 7A, the sensor 10 and the oscillator 12 are connected as in the previous embodiments. However, the output of the oscillator 12 is not connected to an I/O port of the microprocessor 16. Instead, it is preferably connected to the clock input of the microprocessor 16, allowing the oscillator 12 to function as the clock oscillator of the microprocessor. In some types of microprocessor such as the PIC16C505 produced by Microchip Technology Inc., there is a clock output (OSC2) and a counter input (T0CKI). Thus it is possible to produce an oscillator and counter using a simple microprocessor and no special software for charging the capacitor or sampling the voltage, and thus it is not necessary to use a software timer. which takes up the resources of the microprocessor 16. In this embodiment, the oscillator circuit comprises a resistor and a capacitor.

As will be appreciated, now that the microprocessor external clock input receives a time varying signal, the microprocessor lacks a usable time signal. Thus, an external timer 62 is preferably attached to an I/O port of the microprocessor 16 to provide the microprocessor with a time window during which it can count the pulses. The number of pulses appearing in the given time window provides an indication of the sensor signal level as with the fixed interval measurement of the embodiment of FIG. 5.

The embodiment of FIG. 7A thus permits a device to be made with a basic microprocessor and using a minimum of additional circuitry.

A particularly attractive feature of the embodiment of FIG. 7A is that the use of the microprocessor clock for counting pulses permits the use of oscillator frequencies averaging 4 MHz without difficulty, raising the possible sampling rate significantly (8 times the previous example) and thus yielding more precise measurement and greater sensitivity of the detector. In addition this allows for the measurement of higher frequency signals than in previous embodiments without taking up large amounts of processor resources.

Figure 7B:
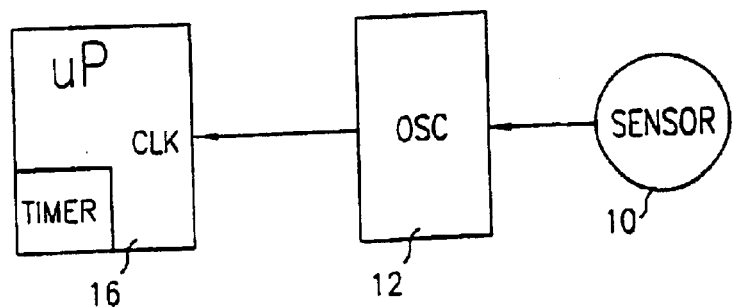
FIG. 7B is a simplified block diagram of a variation of the third embodiment of the present invention in which the external timer of FIG. 7A is replaced by an internal timer built into the microprocessor.

Reference is now made to FIG. 7B. which is a simplified block diagram showing a variation of the embodiment of FIG. 7A. In the embodiment of FIG. 7B the external timer 62 is dispensed with and an internal timer is set up within the microprocessor. This embodiment is particularly applicable where the microprocessor has more than one external clock input, as some relatively more advanced processors have.

Figure 8:
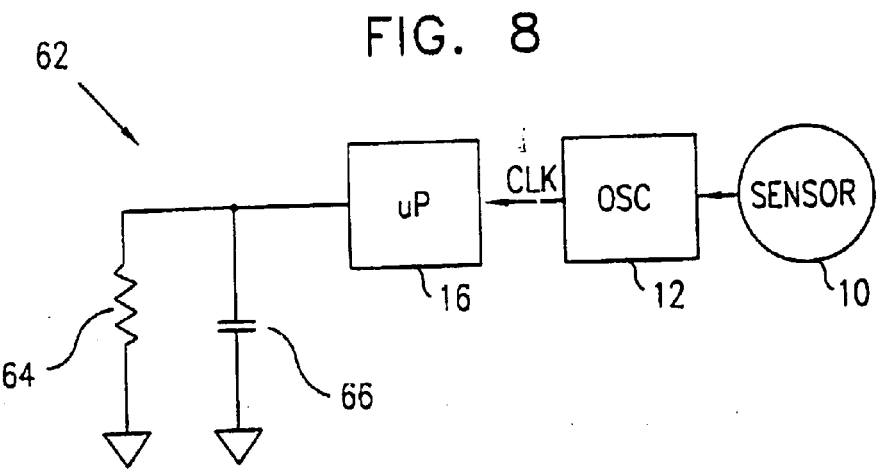
FIG. 8 is a generalized schematic diagram showing one way in which the timer of FIG. 7A may be embodied.

Reference is now made to FIG. 8, which is a generalized schematic diagram showing one way in which the timer 62 of FIG. 7A may be embodied. In FIG. 8 external timer 62 comprises a parallel RC circuit consisting of a resistor 64 connected in parallel with a capacitor 66. As the skilled person will be aware, the timer 62 may be any dedicated timer or even another microprocessor appropriately programmed.

In the timer shown in FIG. 8, the I/O port charges the capacitor 66 to an upper threshold value (preferably Vdd), in output mode and then reverts to high impedance (input mode) and monitors the discharge time of the capacitor 66, to a lower threshold value, through resistor 64. The discharge time of the capacitor 66 is then used to provide the timing window for the microprocessor 16 to count the pulses at its clock input port. The timing input is relatively long (20 ms) and the microprocessor need not monitor the I/O port constantly. Indeed during most of the window the processor can be engaged on other duties. As the 20 ms interval ends the microprocessor preferably repeatedly samples the port for it to turn "low". On "low" the counting cycle is halted and the microprocessor internal counter is read an analyzed.

The microprocessor internal counter is read and analyzed in various ways which may include sophisticated signal processing and analysis of certain criteria of the signal characteristics, in order to evaluate the information being given by the sensor and to produce detection output and alarm indications. A range of signal processing methods are known to the skilled person.

Figure 9:
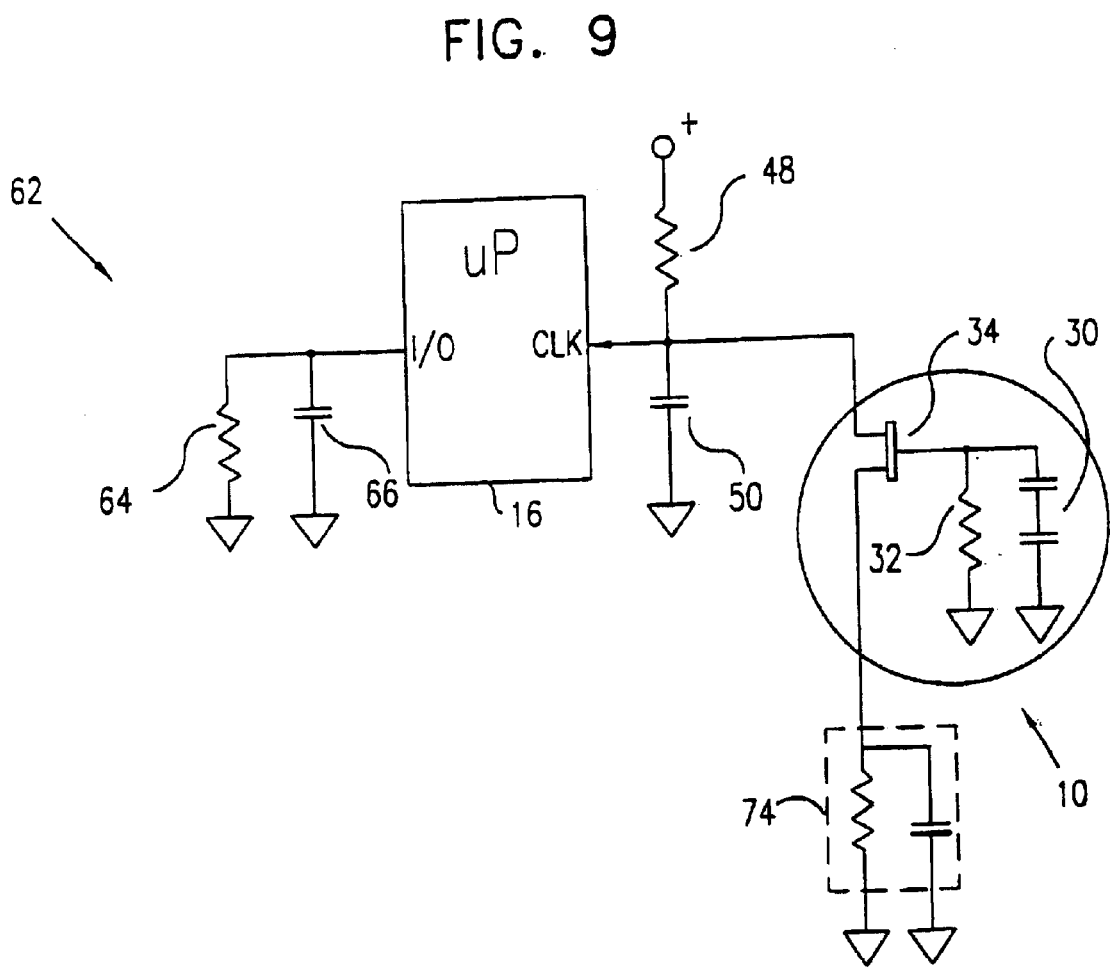
FIG. 9 is a generalized schematic diagram circuitry for frequency domain signal measurement operative in accordance with a fourth embodiment of the present invention.

Reference is now made to FIG. 9 which is a generalized schematic diagram showing a further embodiment of the present invention. In the embodiment of FIG. 9, those parts which have been mentioned before are given identical reference numerals and are not discussed again except to explain the operation of the current embodiment. In the embodiment of FIG. 9 the external oscillator circuit 12 of FIG. 8 consists of a resistor 48 and a capacitor 50 connected directly to the microprocessor 16 clock input. This is a configuration known in the art as an "external RC oscillator" and utilizes the microprocessor clock port's internal circuitry. The circuit shown in FIG. 9 is very simple to produce, requires only the most basic of microprocessors and very few external components and thus is very reliable. An example of such a microprocessor is the PIC16C505, mentioned above.

Figure 10:
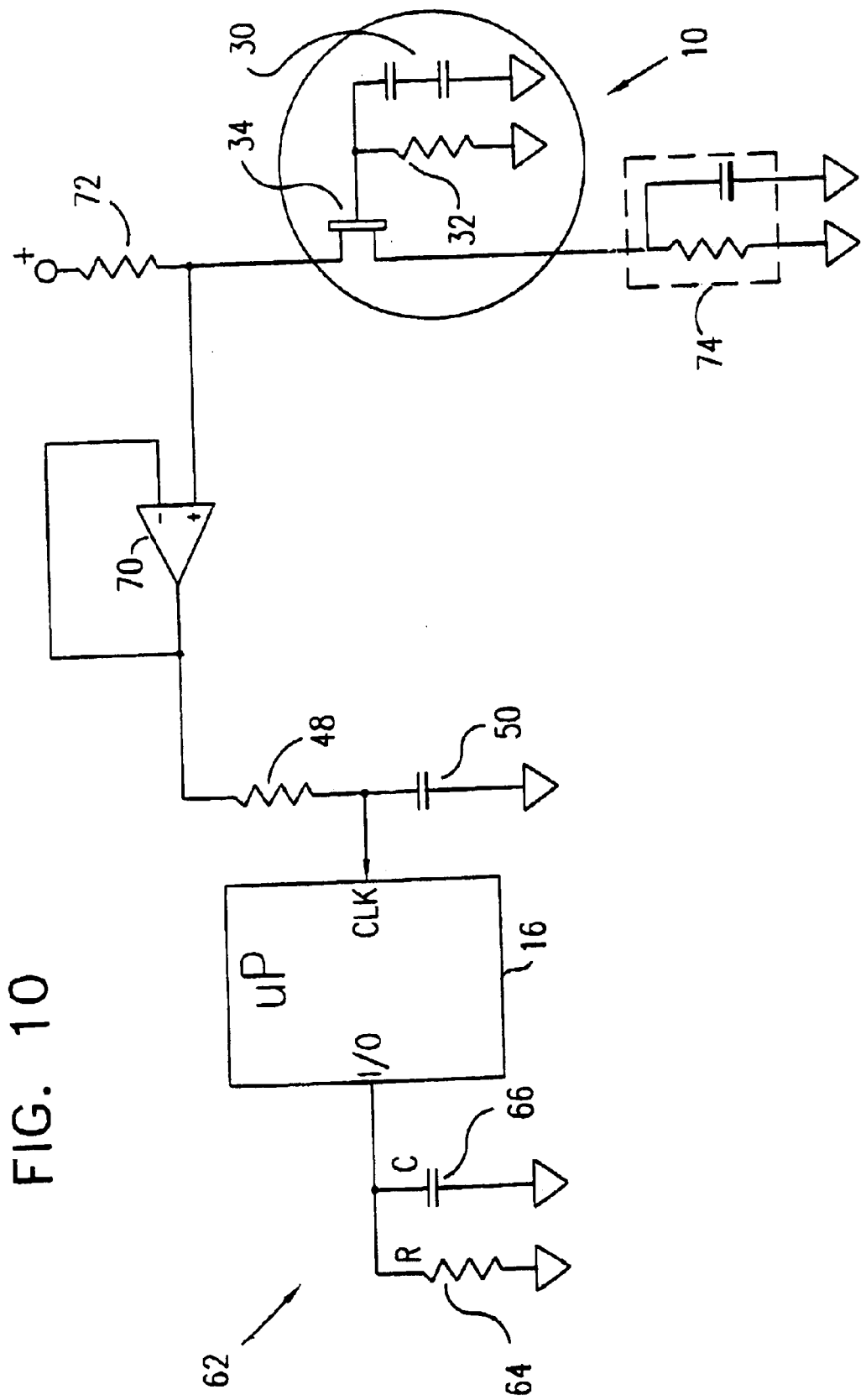
FIG. 10 is a simplified schematic diagram of a first variation of the embodiment of FIG. 9.

Reference is now made to FIG. 10, which is a simplified schematic diagram of a first variation of the device of FIG. 9. In the variation of FIG. 10, parts that are the same as those in previous figures are given the same reference numerals and are not described again. In FIG. 10 an operational amplifier (op-amp) 70 is connected between the sensor 10 and the oscillator 48, 50. The op-amp 70 serves to buffer the oscillator 48, 50 from the sensor 10 and remove any problems of lack of compatibility between the two. For example, referring to FIG. 9, it is desirable, in order to permit rapid charging of capacitor 50. that resistor 48 be small. The high currents resulting from a small resistor 48 may damage the sensor 10 or limit its ability to function. Buffering may be with or without amplification, as appropriate. What will be clear is that the extremely high levels of gain used in the prior art are not necessary in this embodiment. The sensor 10 is preferably connected between two resistors 72 and 74.

Figure 11:
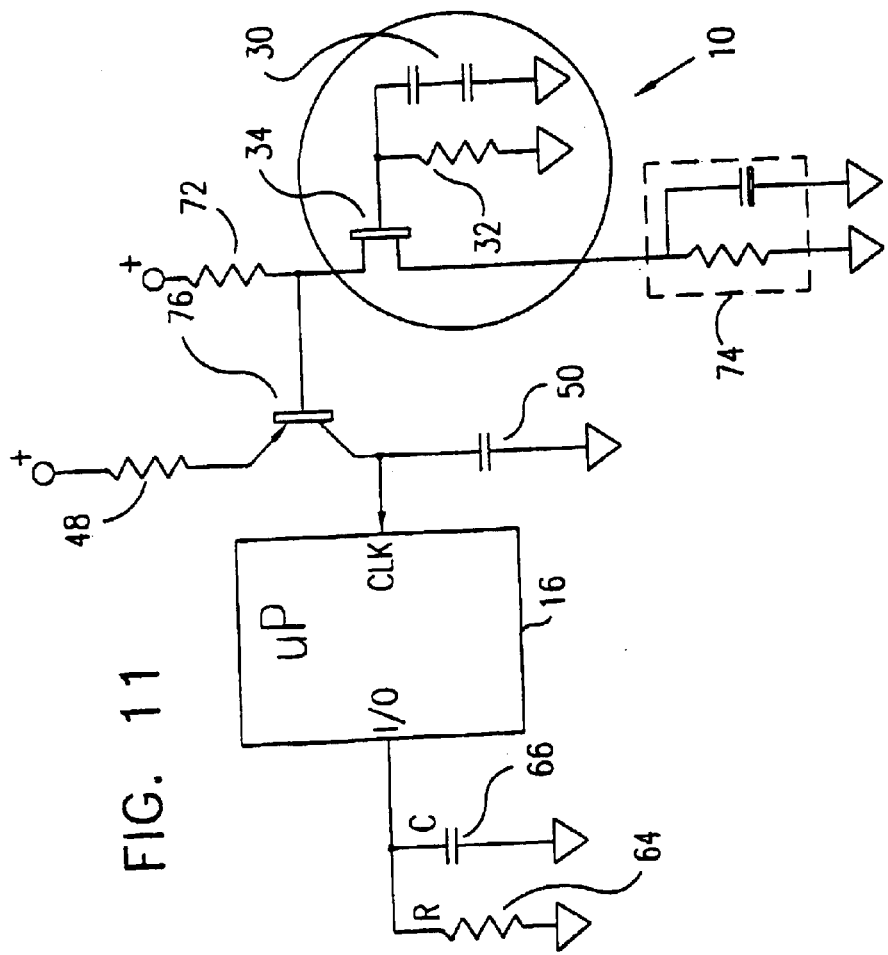
FIG. 11 is a second variation of the embodiment of FIG. 9.

Reference is now made to FIG. 11, which shows a second variation of the embodiment of FIG. 9. In the embodiment of FIG. 11 the op-amp 70 is replaced by a PNP transistor 76. The PNP transistor 76 serves the same function of buffering the sensor 10 from the oscillator 48, 50 or as a controlled current source. Any other buffering method available to the skilled person is equally acceptable, and may include some level of amplification.

The above mentioned embodiments are examples of processing circuits for a pyroelectric sensor which allow for very high detection sensitivity, low sensitivity to interference and which are able to use a basic microprocessor and an absolute minimum of external circuit components. In addition, much of the resources of the processor remain available for other uses. In preferred embodiments, it is possible to obtain the precise form of the signal and to perform further analysis as desired.

One of the additional demands on the microprocessor is to monitor the transfer function of the signal path from the sensor 10 to the point in the microprocessor 16 where counting occurs. Generally, the transfer function is linear but there may be exceptions. Preferably, a transfer function or transfer table is entered into the microprocessor.

A further demand that may be imposed on the microprocessor 16 is to provide regular recalibration. Not all sensors give out the same signal at all times and temperature changes and the like can also affect results. For a known method of dealing with such effects, reference is made to U.S. Pat. No. 5,414,263 (col. 5/60–col. 6/28) which has been quoted extensively above. The method described therein serves simultaneously as a low frequency filter, leading to a relatively fast update rate and possible harm to the measurement precision. In the citation, the measurement is less precise so that no harm is done, but another method is needed by embodiments of the present invention.

Figure 12:
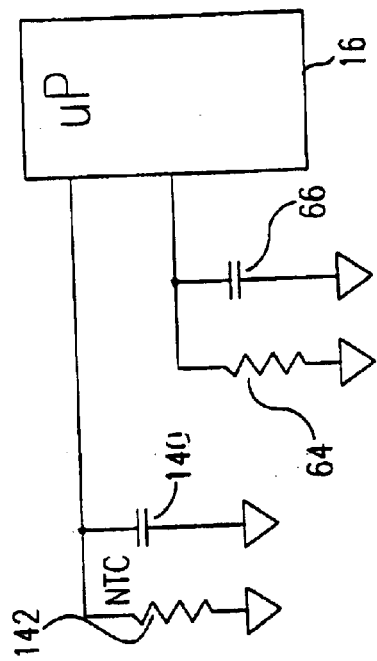
FIG. 12 is a block diagram of a way of modifying frequency measuring circuitry to incorporate temperature compensation.

Reference is now made to FIG. 12 which is a block diagram of a modification of an embodiment of the present invention provided with temperature compensation. In the embodiment of FIG. 12 a capacitor 140 is connected in parallel with a negative temperature coefficient (NTC) resistor 142 to an I/O port of microprocessor 16. The modification is applicable to all preceding and following embodiments in which the clock input is used for measuring the frequency. Since the microprocessor 16 has no fixed time base, standard methods of temperature compensation are not applicable. The present modification utilizes a negative temperature coefficient resistor although there are also known in the art positive temperature coefficient resistors.

In operation the microprocessor 16 charges the capacitor 140 through the I/O port to which it is attached. The port then enters the high-impedance state, monitoring the discharge of the capacitor through resistor 142 over a charge discharge cycle, referred to below as an NTC cycle. A further resistor capacitor pair 64, 66, sets a timing window (see above FIG. 8). As will be appreciated, the duration of the NTC cycle depends on the resistance of the NTC resistor 142 which of course varies with temperature. A look-up table is provided within the microprocessor to enable it to convert NTC cycle durations, or, in a preferred embodiment, a number of NTC cycles within the timing window, directly to absolute temperature. The temperature thus derived is then used to recalculate threshold levels, which in turn reset sensitivity levels.

Figure 13:
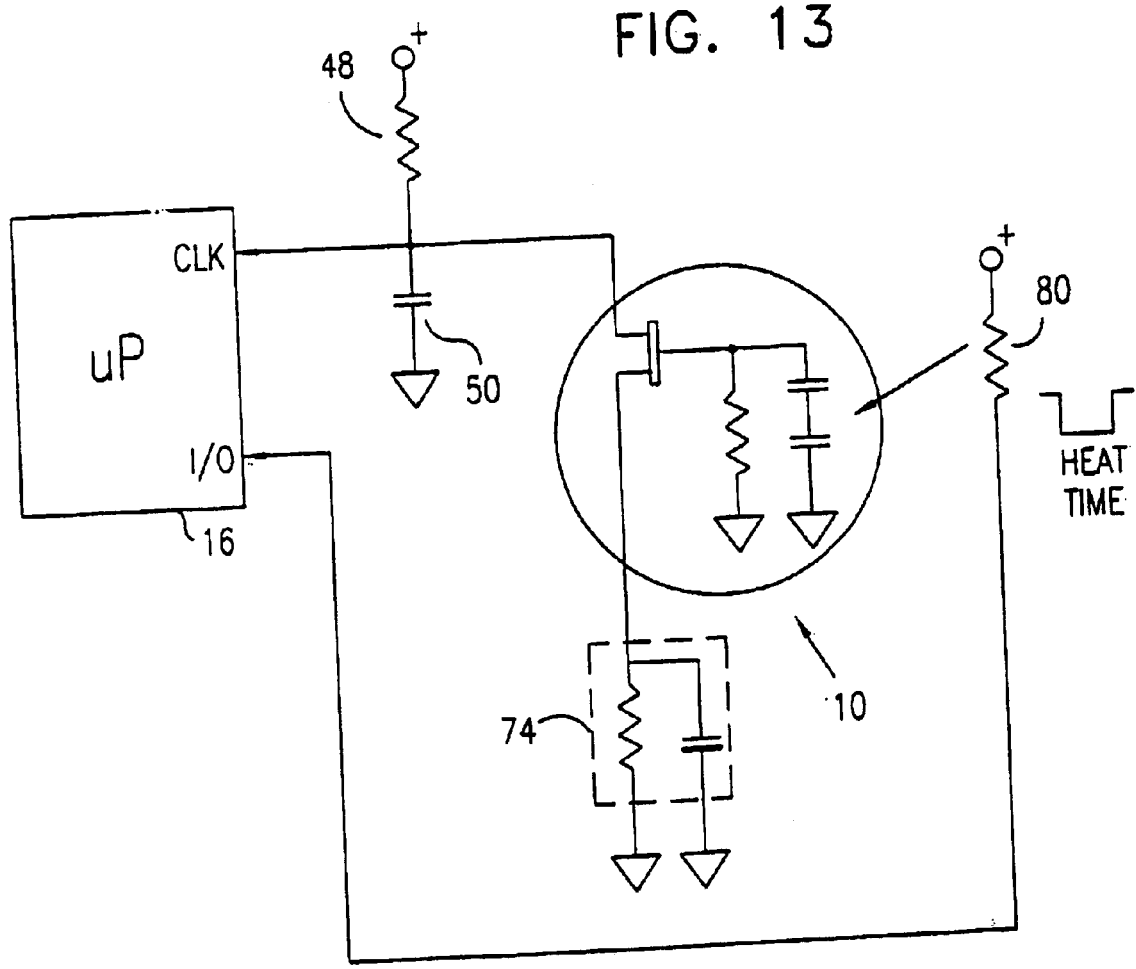
FIG. 13 is an arrangement for calibrating the embodiment of FIG. 9.

Reference is now made to FIG. 13, which shows an arrangement for calibrating the embodiment of FIG. 9. In the embodiment of FIG. 13 a calibration heat source (resistor) 80 is placed in the line of sight of the sensor 10. The heat source 80 is connected to an I/O port of the microprocessor 16, which sends a pulse of a predetermined length to energize the heat source. The effect of the source on the sensor can be used by the microprocessor to recalibrate. The microprocessor preferably monitors the current from the sensor until it reaches a given level and takes that as a basis for computing a recalibration factor. The recalibration process is preferably carried out as a series of iterative steps leading to convergence on a stable calibration level.

Figure 14:
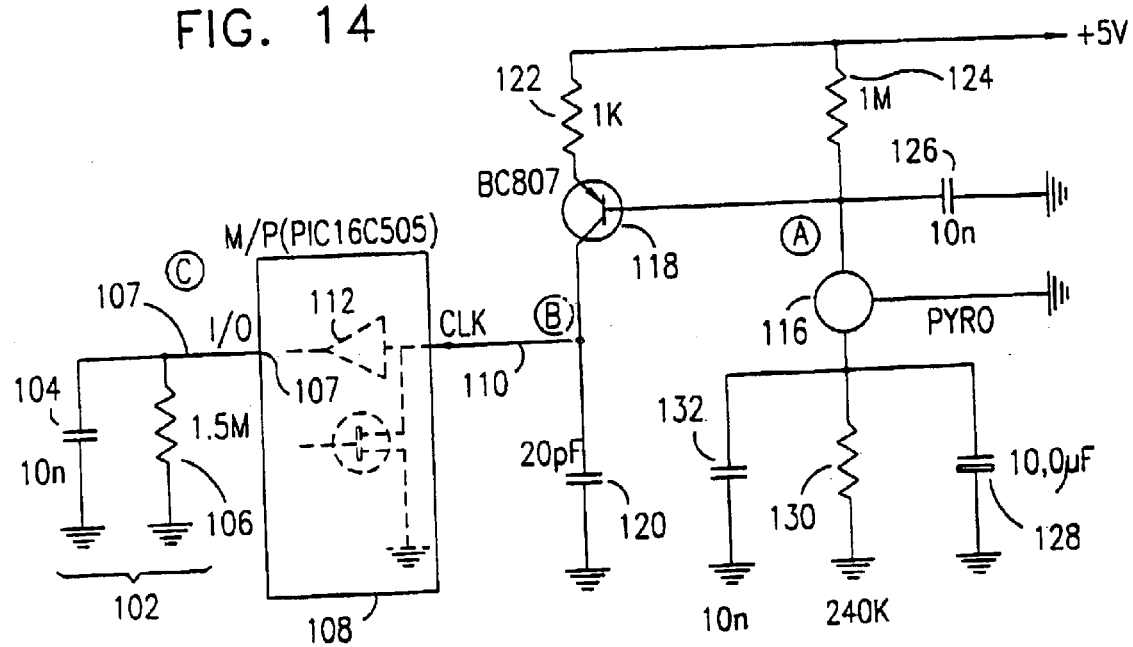
FIG. 14 shows circuitry for frequency domain signal measurement operative in accordance with a further embodiment of a measuring circuit of the present invention.

Reference is now made to FIG. 14, which is a further embodiment of a measuring circuit of the present invention. In FIG. 14 a measuring circuit 100 comprises an external timer 102 which itself comprises a 10 nF capacitor 104 connected in parallel with a 1.5 MΩ resistor 106. The external timer 102 is connected to an I/O port 107 of a microprocessor 108 so as to provide the microprocessor with a timing signal as described above. The microprocessor 108 has an external clock input 110, internally of which is found internal circuitry 112, including inter alia a Schmitt trigger. Details of the internal circuitry are generally made available on the manufacturer's data sheet. In the present case a preferred microprocessor chip is the PIC16C505, which has been referred to above. The manufacturer's data sheet thereof, and especially the details therein regarding the clock input, are hereby incorporated by reference. To the external clock input 110 is connected a pyro-electric sensor 116 via a buffering transistor 118. The buffering transistor 118 is connected to ground via a 20 pF capacitor 120 and to the power supply via a 1 kΩ resistor 122. The sensor 116 is connected to the power supply via a 1 MΩ resistor 124. A 10 nF capacitor 126, for filtering out interference, links the resistor 124 to ground, and the sensor 116 is itself connected to ground via the parallel combination of a 10 $\mu$F electrolytic capacitor 128, a 240 kΩ resistor 130 and a 10 nF capacitor 132, also provided for filtering of interference. Operation of the embodiment of FIG. 14 is essentially the same as that of FIG. 11 in that the signal produced by the sensor 116 is buffered by transistor 118 and is supplied to the external clock input 110 of the microprocessor 118.

Figure 15:
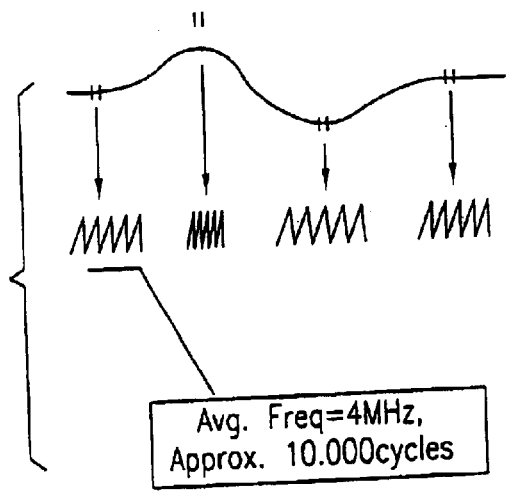
FIGS. 15 and 16 are simplified waveform graphs showing the operation of the measuring circuitry of FIG. 14.
Figure 16:
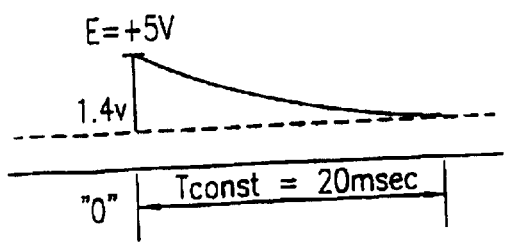

Reference is now made to FIGS. 15, and 16, which are simplified waveform graphs showing the operation of the measuring circuit of FIG. 14. FIG. 15 shows a typical output of the sensor 116 as might be measured at node A in FIG. 14. The pyroelectric sensor 116 output is a very low frequency signal, the amplitude at any given time depending on what is being detected by the sensor. A certain amount of noise is generally superimposed on the waveform shown in FIG. 15, and it is this noise which is partly to blame for the deficiencies in the prior art. Often the interference is in the form of a relatively large amplitude spike of relatively short duration, often referred to as an impulse. In the prior art, a single measurement was made of a relatively long duration charge-recharge cycle. In embodiments of the present invention by contrast, measurements are based on a measured frequency over a large number of relatively short duration charge-recharge cycles, an impulse effecting only one of these cycles and therefore having very little effect on the overall measurement.

The lower part of FIG. 15 is a simplified waveform graph showing the output at node B in FIG. 14. The output at B is effected by the operation of the external clock input circuitry 112 and the current flowing through the buffering transistor 118. This current, which is a product of the sensor signal, causes the changes in the frequency of the waveform of the upper part of FIG. 15. In the lower part of FIG. 15, the average frequency is preferably 4 MHz, to accord with the design speed of the preferred embodiment.

FIG. 16 is a simplified waveform taken from node C of FIG. 14, showing the output of external timer 102. The signal provided by external timer 102 is used by microprocessor 108 against which to measure the frequency of the waveform of FIG. 15. The external timer 102 preferably has a time constant of 20 ms, although different time constants would be selected by the skilled person depending on the application.

Figure 17:
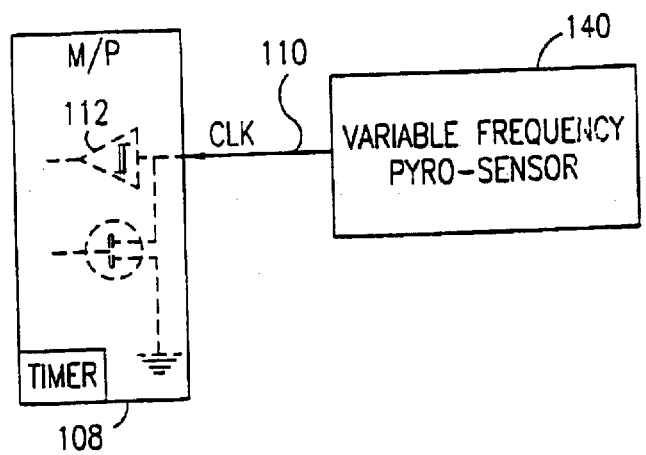
FIG. 17 is a simplified block diagram showing a variation of the measuring circuitry of FIG. 14 with an internal timer.

Reference is now made to FIG. 17 which is a simplified block diagram showing a variation of the measurement circuit of FIG. 14. In FIG. 17 the sensor 116, oscillator 122–120, and buffer 118, with associated components, are all shown as a single block 140 labeled as a variable frequency pyrosensor circuit. The variable frequency pyrosensor circuit 140 is connected to the clock input 110 of the microprocessor 108 as before, but the external timer 102 is replaced by circuitry internal to the microprocessor 108.

Figure 18:
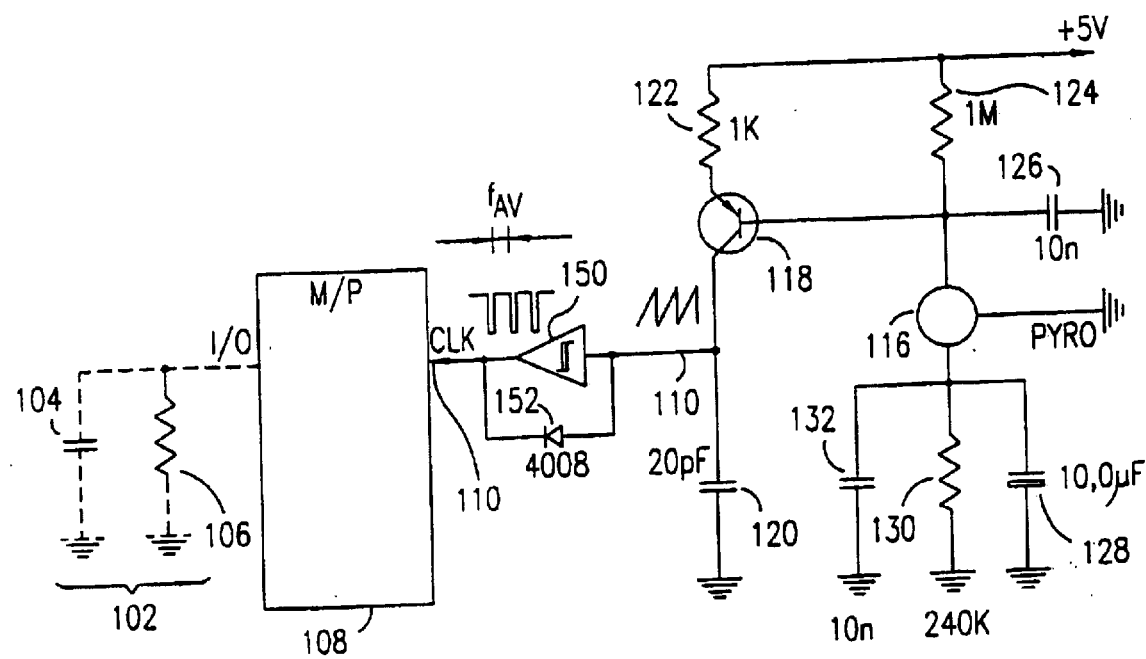
FIG. 18 is a simplified block diagram showing a further variation of the circuit of FIG. 14 with an external Schmitt trigger.

Reference is now made to FIG. 18, which is a simplified block diagram showing a further variation of the circuit of FIG. 14. In the variation of FIG. 18, parts that are the same as in previous figures are given the same reference numerals and are not described in detail again, except as necessary for the understanding of the present embodiment. In FIG. 18, a Schmitt trigger 150 is connected between the buffer 118 and the external clock input 110. The effect of the Schmitt trigger on the waveform output is shown in the diagram on either side of the trigger 150. On the input side of the trigger, a triangular waveform identical to that of the lower part of FIG. 15 represents the oscillator output. On the output side of the trigger 150 is a square waveform which is suitable for direct clocking of a microprocessor. The embodiment of FIG. 18 thus does not rely on the presence of a Schmitt trigger as part of the internal circuitry of the clock input 110. A diode 152 is connected in parallel with the Schmitt trigger 150 to provide a discharge path for the capacitor.

The skilled person will readily appreciate that, although FIG. 18 is shown with an external timer 102, it could equally well be arranged with an internal timer, in accordance with the embodiments of FIG. 17 or of FIG. 7B.

Figure 19:
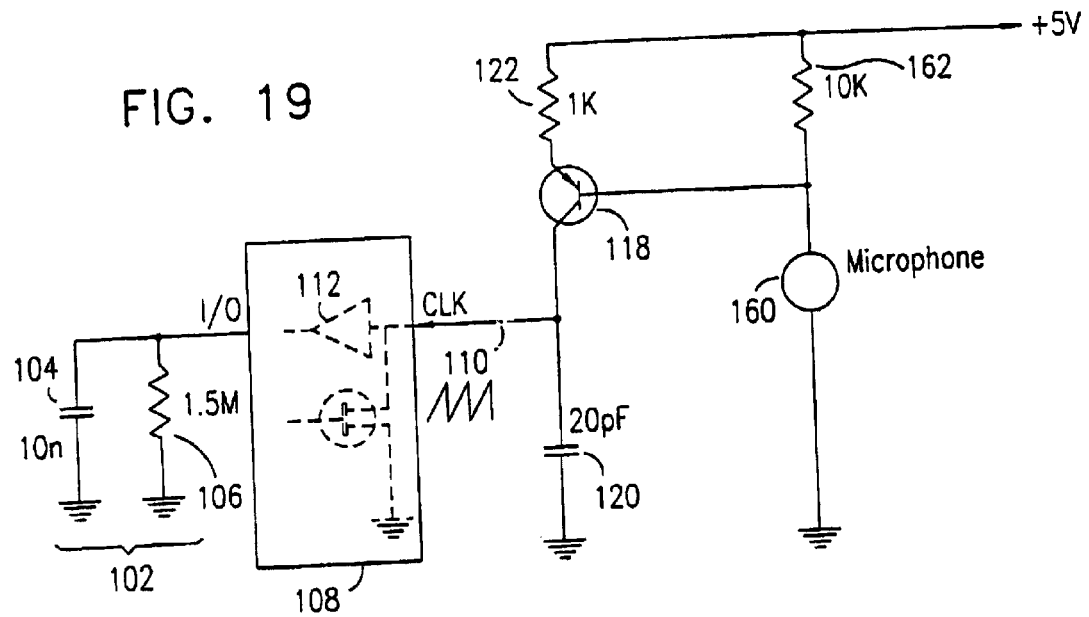
FIG. 19 is a simplified circuit diagram showing a further variation of the measuring circuitry of FIG. 14 in which the pyrosensor is replaced with a microphone, FIG. 20, which is a circuit diagram showing a variation of the measuring circuitry of FIG. 19 using an external Schmitt trigger.

Reference is now made to FIG. 19, which is a simplified circuit diagram showing a further variation of the measurement circuit of FIG. 14. In the variation of FIG. 19, parts that are the same as those shown in previous figures are given the same reference numerals and are not described again, except as necessary for an understanding of the present embodiment.

In FIG. 19, instead of a pyrosensor, a microphone 160 is used as the sensing element. The microphone is connected to the power supply via a 10 kΩ resistor 162. The signal produced by the microphone is similar to that produced by the pyrosensor 116 as shown in FIG. 14 and is thus suitable for processing in the way described hereinabove.

Figure 20:
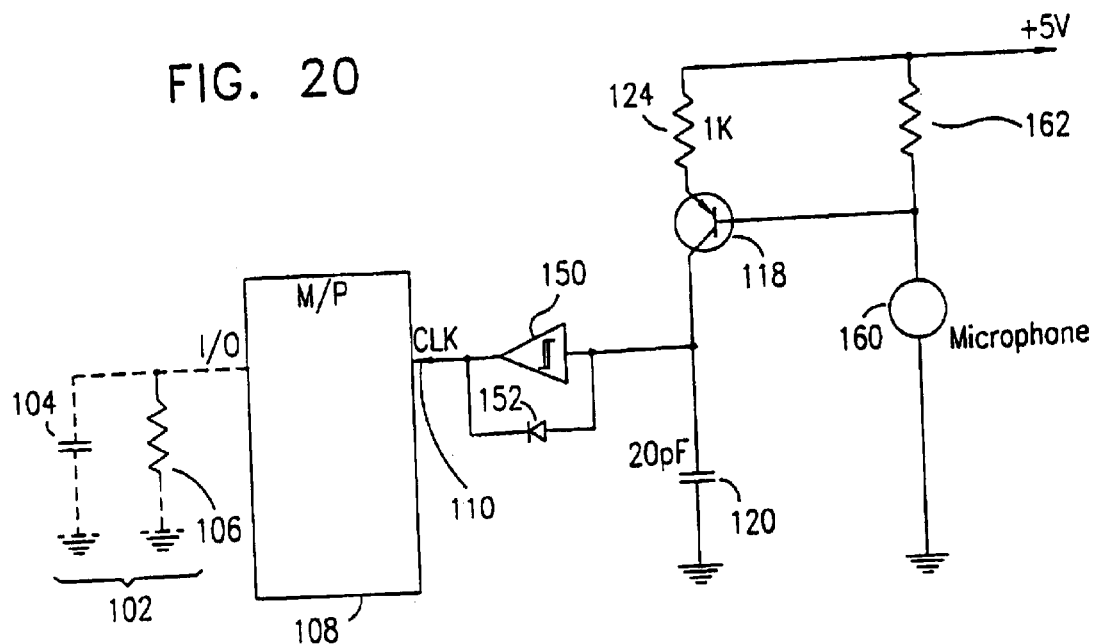

Reference is now made to FIG. 20, which is a circuit diagram showing a variation of the measurement circuit of FIG. 19. Parts that are the same as those shown in previous figures are given the same reference numerals and are not described again, except as necessary for an understanding of the present embodiment. The variation of FIG. 20 again comprises microphone 160 as the sensing element, however, in place of the oscillator-buffer output node being connected directly to the external clock input 110 of the microprocessor 108, the external Schmitt trigger circuit 150, 152 of FIG. 18 is incorporated. This allows for use of a microprocessor that does not have an internal Schmitt trigger as part of its clock circuit.

Figure 21:
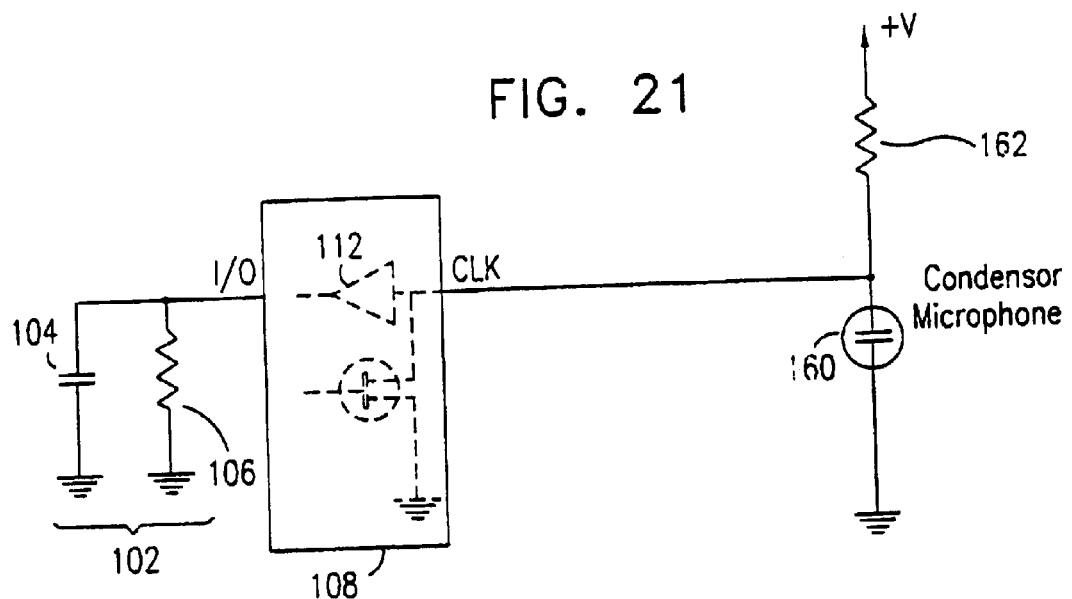
FIG. 21 is a simplified circuit diagram showing a further variation of the measuring circuitry of FIG. 19 incorporating a condenser microphone.

Reference is now made to FIG. 21, which is a simplified circuit diagram showing a further variation of the measurement circuit of FIG. 19, incorporating a condenser microphone. Parts that are the same as those shown in previous figures are given the same reference numerals and are not described again, except as necessary for an understanding of the present embodiment. In the variation of FIG. 21, the buffer 118 is not provided. The embodiment works essentially in the way described above in respect of FIG. 7A except that the sensor is a microphone. It is appreciated that various types of microphone may be used including a capacitor-type microphone.

Figure 22:
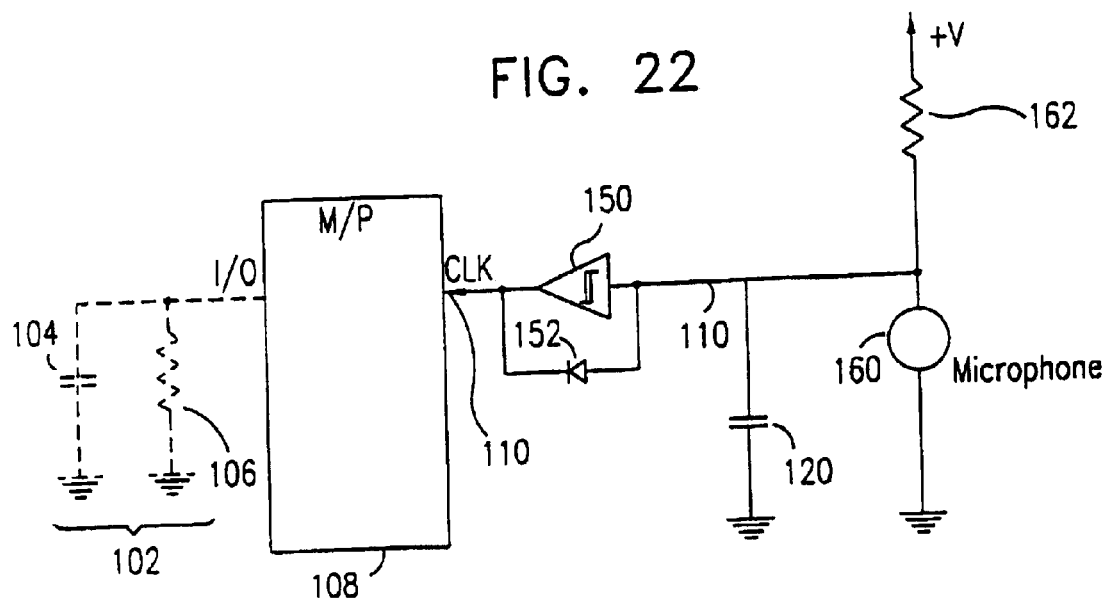
FIG. 22, is a variation of the embodiment of FIG. 21 having an external Schmitt trigger.

Reference is now made to FIG. 22, which is a further variation of the embodiment of FIG. 19. In the embodiment of FIG. 22, parts that are the same as those shown in previous figures are given the same reference numerals and are not described again, except as necessary for an understanding of the present embodiment. In FIG. 22, once again there is no buffer. In addition the Schmitt trigger circuit 152 of FIG. 18 is provided so that a microprocessor not comprising an internal Schmitt trigger can be utilized.

It will be appreciated that in the case of each of FIGS. 19 to 22, an internal timer may be used to replace external timer 102. In addition a range of different sensor types may be used, including glassbreaking detectors, ultrasonic, infrasonic and other detectors.

Figure 23:
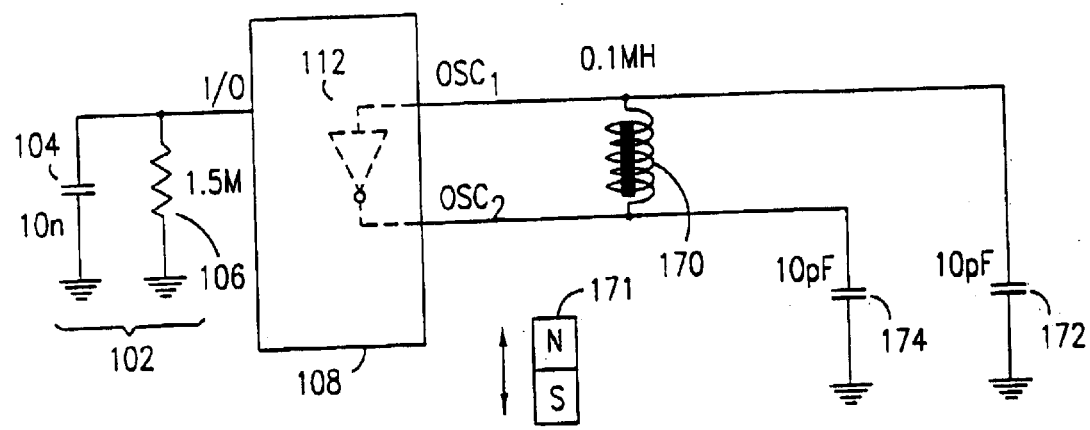
FIG. 23 is a simplified circuit diagram showing a further variation of the measuring circuitry of FIG. 14, in which the pyrosensor is replaced by an inductor and core arrangement for electric field measurements.

Reference is now made to FIG. 23, which is a simplified circuit diagram showing a further variation of the measurement circuit of FIG. 14. In FIG. 23, parts that are the same as those shown in previous figures are given the same reference numerals and are not described again, except as necessary for an understanding of the present embodiment. In place of the pyrosensor 16 of FIG. 14, the sensing element is here provided by an inductor and core arrangement 170 and a magnet 171. As the magnet 171 moves in relation to the arrangement 170, the magnetic field changes, moving the operating point of the arrangement 170. Thus the impedance of the coil varies and affects the microprocessor clock input. The result can be used to measure vibration or other forms of movement or displacement. The inductor arrangement 170 is connected on either side to earth via two 10 pF capacitors 172 and 174 respectively which serve inter alia as oscillating capacitors.

The detector shown in FIG. 23 can be utilized as a displacement sensor attached to works of art in museums and galleries. This can be done by attaching either of the detector circuit 170 and the magnet 171 to the work. It can sense the most gentle vibrations or gradual movement in order to initiate an alarm.

It will be appreciated that in the case of FIG. 23, an internal timer may be used to replace external timer 102.

Figure 24:
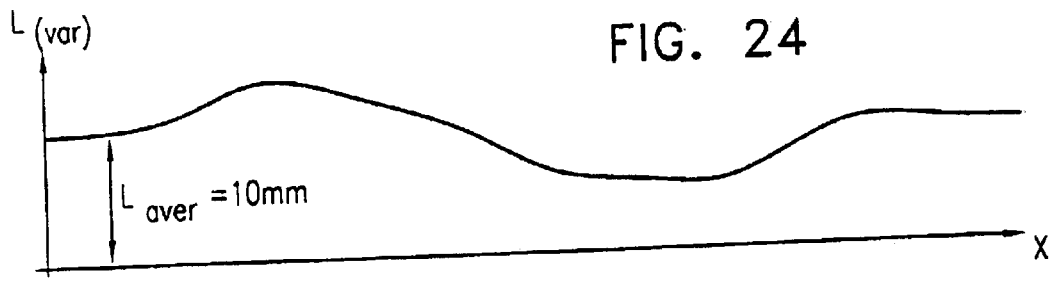
FIG. 24 is a simplified graph showing a typical variation in inductance of the inductor and coil arrangement of FIG. 23.

Reference is now made to FIG. 24, which is a simplified graph showing a typical variation in inductance of the inductor and coil arrangement 170. The graph shows a low frequency oscillation with superimposed noise. As will be appreciated, the form of the graph is very similar to that of the upper part of FIG. 15.

Figure 25:
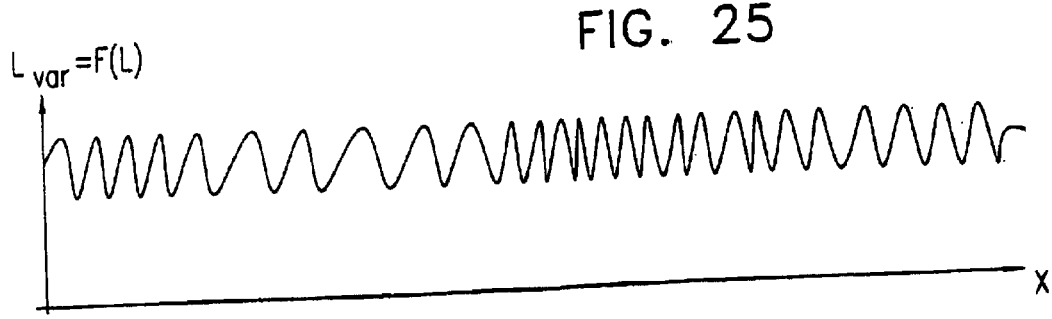
FIG. 25 is a simplified waveform diagram showing the clock input to a microprocessor from an inductor and coil arrangement arranged as in FIG. 23 and wherein the inductance varies as shown in FIG. 24.

Reference is now made to FIG. 25 which is a simplified waveform diagram showing the input to the microprocessor 108 from an inductor and coil arrangement 170 arranged as in FIG. 23 and wherein the inductance varies as shown in FIG. 24. The graph shows a sinusoidal oscillation at a relatively high frequency, which can be measured by comparison to the timer signal of external timer 102, as described above with reference to FIG. 7A. The figure is considerably simplified, and as the skilled person will be aware, is not to scale. The oscillating frequency is in reality several orders of magnitude higher than the frequency of the sensor signal.

Figure 26:
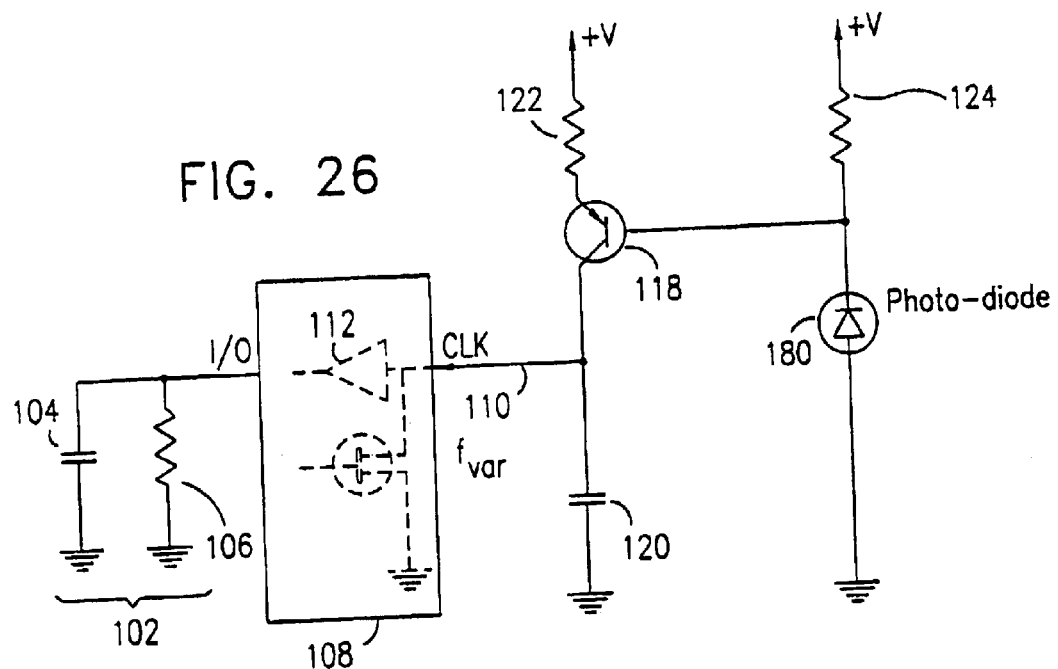
FIG. 26 is a simplified circuit diagram showing a further variation of the circuit of FIG. 14 in which a photodiode is used in place of a pyrosensor.

Reference is now made to FIG. 26, which is a simplified circuit diagram showing a further variation of the circuit of FIG. 14. In the embodiment of FIG. 26, parts that are the same as those shown in previous figures are given the same reference numerals and are not described again, except as necessary for an understanding of the present embodiment. The circuit of FIG. 26 is essentially the same as that of FIG. 14, except that the sensing element is a photodiode 180. The skilled person will appreciate that that the sensor could equally well be a photoresistor and could additionally serve as the basis for a remote control arrangement or even for remote analog communication.

It will be appreciated that in the case of FIG. 26, an internal timer may be used to replace external timer 102.

Figure 27:
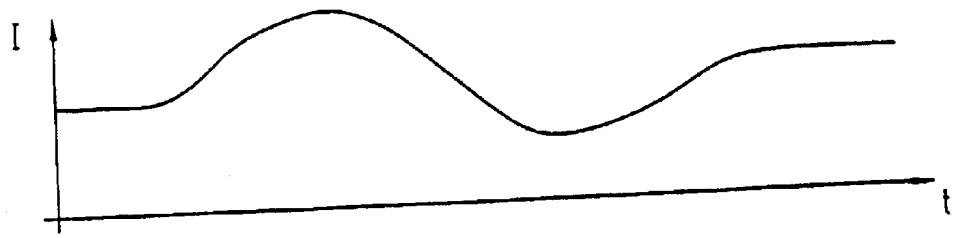
FIG. 27 is a simplified graph showing typical illumination levels falling on the photodiode of FIG. 26.

Reference is now made to FIG. 27, which is a simplified graph showing typical illumination levels falling on photodiode 180. A low frequency sinusoid is shown.

Figure 28:
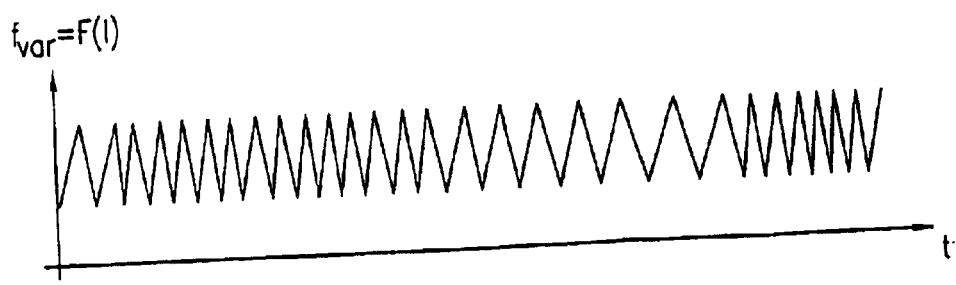
FIG. 28 is a simplified waveform diagram showing the waveform input to the microprocessor clock input that would be expected from the circuit of FIG. 26 when the photodiode 180 is illuminated as shown in FIG. 27.

Reference is now made to FIG. 28, which is a simplified waveform diagram showing the waveform input to the microprocessor clock input that would be expected from the circuit of FIG. 26 when the photodiode 180 is illuminated as shown in FIG. 27. The diagram shows a rapidly oscillating signal which can easily be measured against the output of the timer 102.

Figure 29:
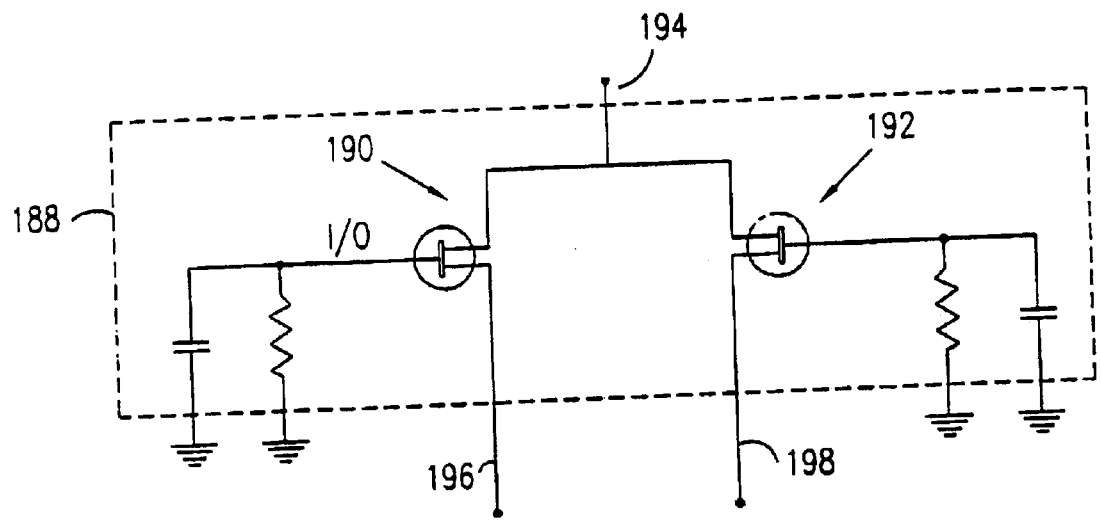
FIG. 29 is a generalized circuit diagram showing a typical quad pyrosensor.

Reference is now made to FIG. 29 which is a generalized circuit diagram showing a typical quad pyrosensor as known in the art. A quad pyrosensor 188 preferably comprises two pyrosensors 190 and 192 connected back to back and having a common node 194 and individual output nodes 196 and 198 for each of the pyrosensors 190 and 192 respectively. As the skilled person will know, a quad pyrosensor has improved false alarm rejection properties and can advantageously be connected to a variation of the circuit of FIG. 14.

Figure 30:
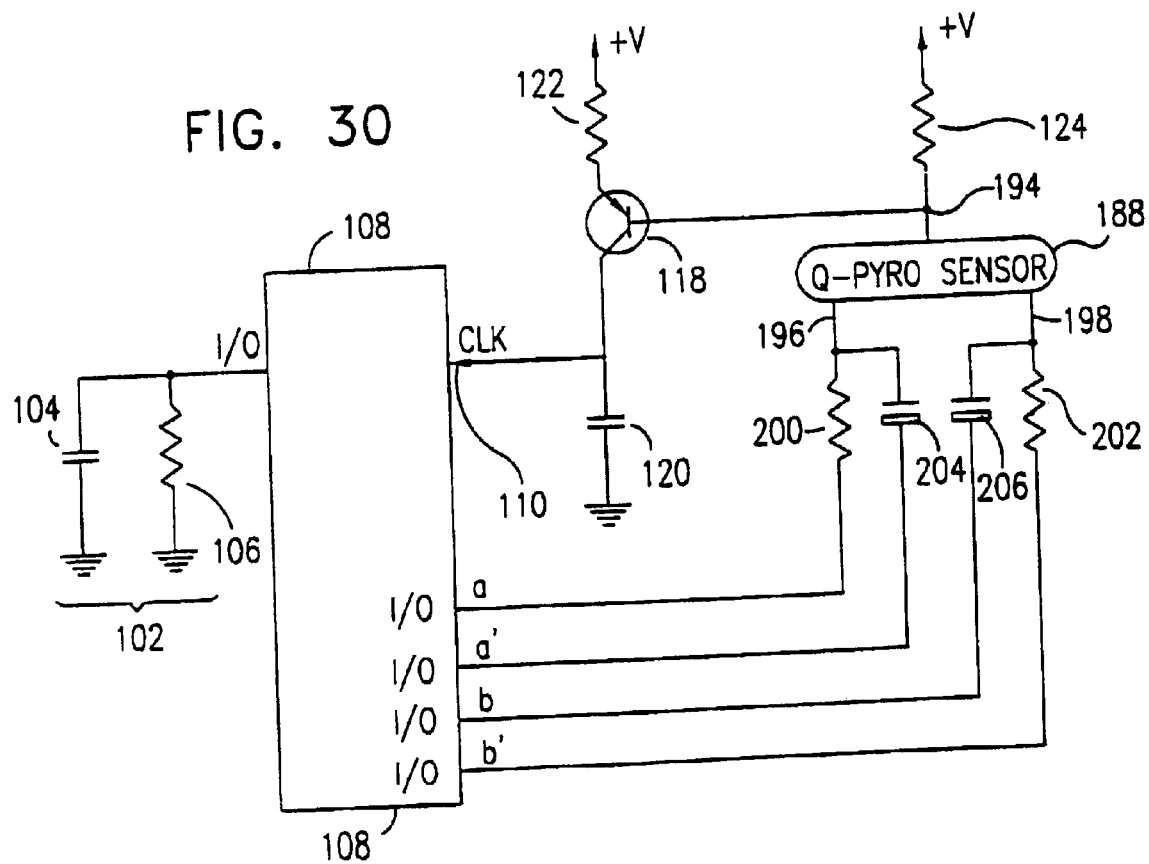
FIG. 30 is a simplified circuit diagram showing a variation of the circuitry of FIG. 14 incorporating the Quad PIR detector of FIG. 29.

Reference is now made to FIG. 30 which is a simplified circuit diagram showing a variation of the circuit of FIG. 14 incorporating the Quad PIR detector 188. In FIG. 30 parts that are the same as those shown in previous figures are given the same reference numerals and are not described again, except as necessary for an understanding of the present embodiment. The output 196 is connected to a microprocessor port a via a resistor 200 and to a port a' via an electrolytic capacitor 204. The output 198 is connected to a microprocessor port b via an electrolytic capacitor 206 and to a microprocessor port b' via a resistor 202. The two detectors 190 and 192 provide measurements in turn under the control of the microprocessor 16 over a cycle as follows. The ports a and a' are set at high impedance and ports b and b' are grounded so that the sensor 192 is able to affect the microprocessor clock as described above. This is followed by a step in which ports b and b' are set at high impedance and ports a and a' are grounded, allowing sensor 190 to affect the microprocessor. The individual output connections preferably operate an AND-based control system within the microprocessor to identify whether one or both of the pyrosensors 190 and 192 have been activated. If only one of them has been activated the alarm is preferably ignored as false. Other decision-making criteria are also possible.

Figure 31:
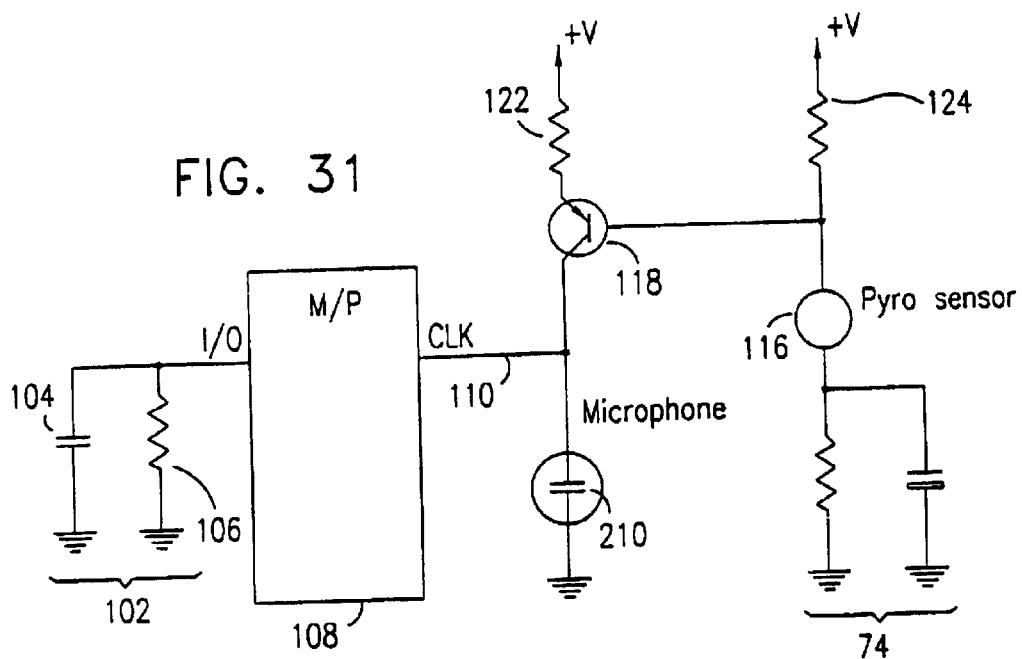
FIG. 31 is a simplified circuit diagram showing a hybrid circuit in which a pyrosensor is combined with a condenser microphone.

Reference is now made to FIG. 31, which is a simplified circuit diagram showing how a pyrosensor 116 can be combined with a condenser microphone 210 to construct a dual technology detector. In FIG. 31, parts that are the same as those shown in previous figures are given the same reference numerals and are not described again, except as necessary for an understanding of the present embodiment. The condenser microphone 210 is connected in place of the capacitor 120 of FIG. 14 to form part of the pulse generating circuit, and thus serves the dual function of sensing sound and providing oscillations. The sound and pyrosensor signals are respectively of different frequency bands and can thus be filtered and treated separately. In one preferred embodiment the filtering can be carried out within the microprocessor.

Figure 32:
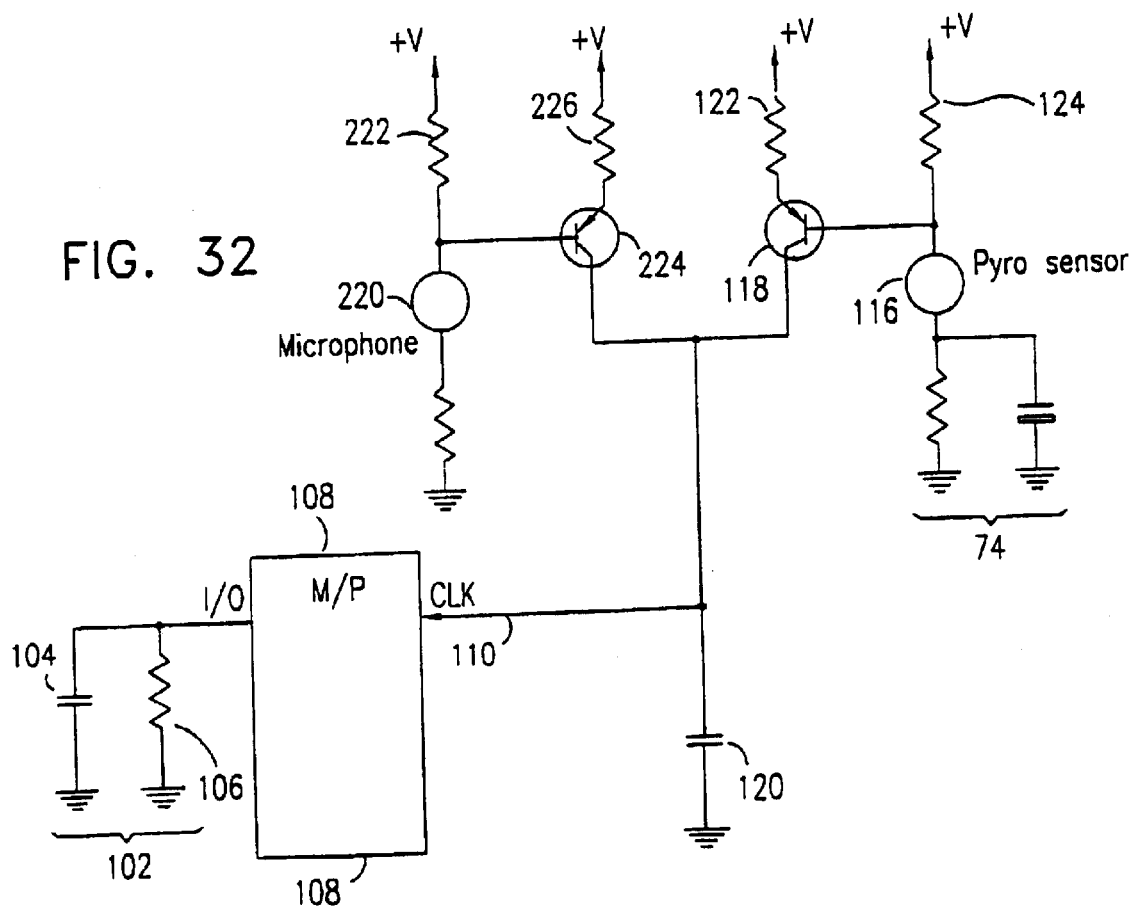
FIG. 32 is a simplified circuit diagram of a variation of the circuit of FIG. 31 in which a pyrosensor is combined with an electret microphone.

Reference is now made to FIG. 32, which is a simplified circuit diagram of a variation of the circuit of FIG. 31. In FIG. 32, parts that are the same as those shown in previous figures are given the same reference numerals and are not described again, except as necessary for an understanding of the present embodiment. In the circuit of FIG. 32, instead of condenser microphone 210, the normal oscillator capacitor 120 is in its usual place, and an electret microphone 220 is biased by a biasing resistor 222 and connected to the gate of a second buffering transistor 224. The second buffering transistor is itself connected to the power supply via a resistor 226, and thus the oscillating capacitor receives a signal which is the combined effect of the pyrosensor 116 and the microphone 220.

It will be appreciated that in each of the cases of FIGS. 27–32, an internal timer may be used to replace external timer 102.

The circuits shown in FIGS. 31 and 32 can be used for dual technology detectors of various types. For example the microphone 210 or 220 may be used to detect simultaneously two different acoustic phenomena, vibration, shock etc. These phenomena may differ in frequency, amplitude etc. More generally, dual technology detectors of the type described above, may be built using other combinations of two or even more sensors. as will be apparent to the skilled person, as long as a suitable oscillator can be incorporated and as long as differentiable signals are produced.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention includes both combinations and subcombinations of the various features described hereinabove as well as variations and modifications thereof which would occur to persons skilled in the art upon reading the foregoing description and which are not in the prior art.

What is claimed is:

1. Circuitry for signal measurement comprising:
   a signal input,
   a microprocessor having a clock input, and
   an oscillator,
   said oscillator being operable to generate a pulse signal, the frequency of which is a function of amplitude of a first signal received at said signal input, and to supply said pulse signal to said clock input of said microprocessor,
   and said microprocessor being operable to measure the frequency of said pulse signal by comparing the pulse signal with a timing signal, thereby providing an indication of the amplitude of said first signal.

2. Circuitry according to claim 1 wherein said timing signal is in the form of a timing window.

3. Circuitry according to claim 2, wherein said pulse signal is connected directly to said microprocessor.

4. Circuitry according to claim 2, wherein said microprocessor is operative to count said pulse signal over said timing window.

5. Circuitry according to claim 1, wherein said pulse signal comprises pulses which are countable by a counter, said counter being connected to said microprocessor to give an indication to said microprocessor that a given number of pulses has been counted.

6. Circuitry according to claim 1, wherein said pulse signal is connected directly to said microprocessor.

7. Circuitry according to claim 1 and also comprising:
a timer,
wherein an output of said timer comprises said timing signal.

8. Circuitry according to claim 7, wherein said timer comprises a capacitor-based circuit.

9. Circuitry according to claim 7, wherein said timer is connectable to utilize an I/O port of said microprocessor.

10. Circuitry according to claim 1, wherein said clock input is an external clock input.

11. Circuitry according to claim 1, wherein said oscillator is wholly external to said microprocessor.

12. Circuitry according to claim 1, wherein said oscillator utilizes internal features of said microprocessor.

13. Circuitry according to claim 1, wherein said signal input comprises an analog signal.

14. Circuitry according to claim 1, wherein said signal input comprises a digital signal.

15. Circuitry according to claim 1, operable to measure signals from sensors by converting amplitudes of said signals into a frequency and making a measurement of the frequency.

16. Circuitry for signal measurement comprising:
a signal input,
a microprocessor having a clock input, and
a clock oscillator circuit connected to said clock input and operable to generate a clock signal for said microprocessor, wherein the frequency of said microprocessor clock signal varies as a function of the amplitude of a signal received at said signal input, and
said microprocessor is operable to process the clock signal and to provide an indication of the amplitude of said signal received at said signal input.

17. Circuitry according to claim 16, further comprising a timer operable to define a pulse counting time duration for counting a plurality of said clock pulses, and wherein said timer is further usable by said microprocessor in processing said signal.

18. Circuitry according to claim 17, wherein said microprocessor is operable to count a plurality of pulses over said time duration.

19. Circuitry according to claim 17, wherein said timer comprises a capacitor-based circuit.

20. Circuitry according to claim 17, wherein said timer is connectable to utilize an I/O port of said microprocessor.

21. Circuitry according to claim 16, wherein said clock oscillator circuit utilizes a microprocessor built-in clock circuit.

22. Circuitry according to claim 16, wherein said oscillator is wholly external to said microprocessor.

23. Circuitry according to claim 16, wherein said signal received at said signal input is an analog signal.

24. Circuitry according to claim 16, wherein said signal received at said signal input is a digital signal.

25. Circuitry according to claim 16, wherein said signal received at said signal input is produced by a sensor.

26. Circuitry according to claim 25, wherein said sensor is part of a security system.

27. Circuitry according to claim 25, wherein said sensor is an infra-red sensor.

28. Circuitry according to claim 25, wherein said sensor is a pyroelectric sensor.

29. Circuitry according to claim 25, wherein said sensor is connected to said clock oscillator circuit via an interface circuit.

30. Circuitry according to claim 29 wherein said interface circuit is operable to perform buffering.

31. Circuitry according to claim 30 wherein said interface circuit is operable to perform amplification.

32. Circuitry according to claim 16, operable to measure signals from sensors by converting amplitudes of said signals into a frequency and making a measurement of the frequency.

33. Circuitry for signal measurement comprising:
a microprocessor operative to receive a signal having a varying amplitude from a sensor, said signal being provided as an input to a clock circuit connected to a clock input of said microprocessor, the clock circuit comprising a converter for converting said varying amplitude into a varying frequency, and
a measuring device operable to determine parameters of the sensor signal by measurement of variations in the frequency.

34. A detection apparatus comprising:
a sensor providing sensor signal output, a microprocessor having a clock input, and a clock oscillator circuit connected to said clock input and generating a clock signal for said microprocessor, wherein the frequency of said microprocessor clock signal varies as a function of the amplitude of said sensor signal, and said microprocessor processes the clock signal and provides a detection indication when said sensor signal fulfils certain criteria.

35. A detection apparatus according to claim 34 further comprising a timer operable to define a pulse counting interval for counting a plurality of said clock pulses, and wherein said timer is usable by said microprocessor in processing the signal.

36. A detection apparatus according to claim 35 wherein said microprocessor is operable to count said plurality of pulses over said time duration.

37. A detection apparatus according to claim 35, wherein said timer comprises a capacitor-based circuit.

38. A detection apparatus according to claim 35, wherein said timer utilizes an I/O port of said microprocessor.

39. A detection apparatus according to claim 34, wherein said clock oscillator is external to said microprocessor.

40. A detection apparatus according to claim 34, wherein said clock oscillator utilizes the microprocessor built-in clock circuit.

41. A detection apparatus according to claim 34, wherein said sensor signal is an analog signal.

42. A detection apparatus according to claim 34, wherein said sensor signal is a digital signal.

43. A detection apparatus according to claim 34, when used for intrusion prevention.

44. A detection apparatus according to claim 34, when used for theft prevention.

45. A detection apparatus according to claim 34, when used for lighting control.

46. A detection apparatus according to claim 34, when used for vibration sensing.

47. A detection apparatus according to claim 34, when used for shock sensing.

48. A detection apparatus according to claim 34, when used for displacement sensing.

49. A detection apparatus according to claim 34, wherein said sensor is any one of a group comprising an infra-red sensor, a quad-element infrared sensor, an acoustic sensor, an infrasonic sensor, an ultrasonic sensor, a photoelectric sensor, an electromagnetic field sensor, a temperature sensor, and a smoke-detecting sensor.

50. A detection apparatus according to claim 49, comprising a second sensor, and wherein said second sensor is any one of a group comprising an infra-red sensor, a quad-element infrared sensor, an acoustic sensor, an infrasonic sensor, an ultrasonic sensor, a photoelectric sensor, an electromagnetic field sensor, a temperature sensor, and a smoke-detecting sensor.

51. A method for signal measurement comprising:

providing a first signal to an oscillator circuit operable to generate a a clock input for a microprocessor, wherein the frequency of said clock signal varies as a function of the amplitude of said first signal, and said microprocessor is operable to process the clock signal and to determine parameters of said first signal by measuring variations in the frequency of said clock signal.

* * * * *